(12) United States Patent
Mikami et al.

(10) Patent No.: US 10,803,569 B2
(45) Date of Patent: Oct. 13, 2020

(54) IMAGE PROCESSING APPARATUS, CALIBRATION METHOD, AND COMPUTER PROGRAM

(71) Applicant: Sony Interactive Entertainment Inc., Tokyo (JP)

(72) Inventors: Hiroshi Mikami, Tokyo (JP); Kenichiro Yokota, Tokyo (JP); Shin Watanabe, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/400,150

(22) Filed: May 1, 2019

(65) Prior Publication Data
US 2020/0051525 A1    Feb. 13, 2020

(30) Foreign Application Priority Data
Aug. 9, 2018 (JP) .................. 2018-150668

(51) Int. Cl.
*G06T 5/50* (2006.01)
*G06T 5/00* (2006.01)
(Continued)

(52) U.S. Cl.
CPC .......... *G06T 5/50* (2013.01); *G06T 5/009* (2013.01); *G09G 5/10* (2013.01); *H04N 1/6055* (2013.01);
(Continued)

(58) Field of Classification Search
CPC ....... G06T 5/007; G06T 5/009; H04N 1/6055; H04N 13/327
See application file for complete search history.

(56) References Cited

U.S. PATENT DOCUMENTS

| 6,686,953 B1* | 2/2004 | Holmes | H04N 1/6033 |
| | | | 348/179 |
| 8,346,009 B2* | 1/2013 | Zhai | G09G 3/2003 |
| | | | 382/274 |

(Continued)

FOREIGN PATENT DOCUMENTS

| CN | 106791865 A | 5/2017 |
| JP | 201134255 A | 5/2001 |

(Continued)

OTHER PUBLICATIONS

Decision to Grant for corresponding JP 2018-150668, 8 pages, dated Aug. 13, 2020.

*Primary Examiner* — Sepehr Azari
(74) *Attorney, Agent, or Firm* — Matthew B. Dernier, Esq.

(57) ABSTRACT

An image processing apparatus includes a calibration section acquiring luminance characteristics of a display apparatus on a basis of a user manipulation for a calibration screen image displayed on the display apparatus, a luminance transforming section transforming a range of luminance composing a pixel value of an image into a range of luminance with which the image can be outputted as a display image on a basis of the luminance characteristics, and an output section outputting data associated with an image having the luminance after the transformation as a pixel value. The calibration section adjusts an initial state of the calibration screen image on a basis of information peculiar to the display apparatus, and then causes the calibration screen image to be displayed on the display apparatus.

15 Claims, 12 Drawing Sheets

(51) Int. Cl.
*G09G 5/10* (2006.01)
*H04N 13/327* (2018.01)
*H04N 1/60* (2006.01)

(52) U.S. Cl.
CPC ... *H04N 13/327* (2018.05); *G09G 2320/0693* (2013.01); *G09G 2340/06* (2013.01)

(56) References Cited

U.S. PATENT DOCUMENTS

| | | | | |
|---|---|---|---|---|
| 10,192,294 | B2* | 1/2019 | Tsuru | G06T 5/009 |
| 10,733,963 | B2 | 8/2020 | Yokota | |
| 2012/0293400 | A1* | 11/2012 | Matsubayashi | G09G 3/3406 |
| | | | | 345/88 |
| 2013/0027421 | A1* | 1/2013 | Bala | H04N 1/6033 |
| | | | | 345/594 |
| 2016/0292834 | A1 | 10/2016 | Tsuru | |
| 2016/0358584 | A1* | 12/2016 | Greenebaum | G06T 11/001 |
| 2019/0287494 | A1 | 9/2019 | Yokota | |
| 2020/0053311 | A1 | 2/2020 | Ogiso | |

FOREIGN PATENT DOCUMENTS

| | | | |
|---|---|---|---|
| JP | 2009086550 | A | 4/2009 |
| JP | 2016058848 | A | 4/2016 |
| JP | 2018006877 | A | 1/2018 |
| JP | 2018011274 | A | 1/2018 |
| JP | 2018060075 | A | 1/2018 |

* cited by examiner

100a

100b

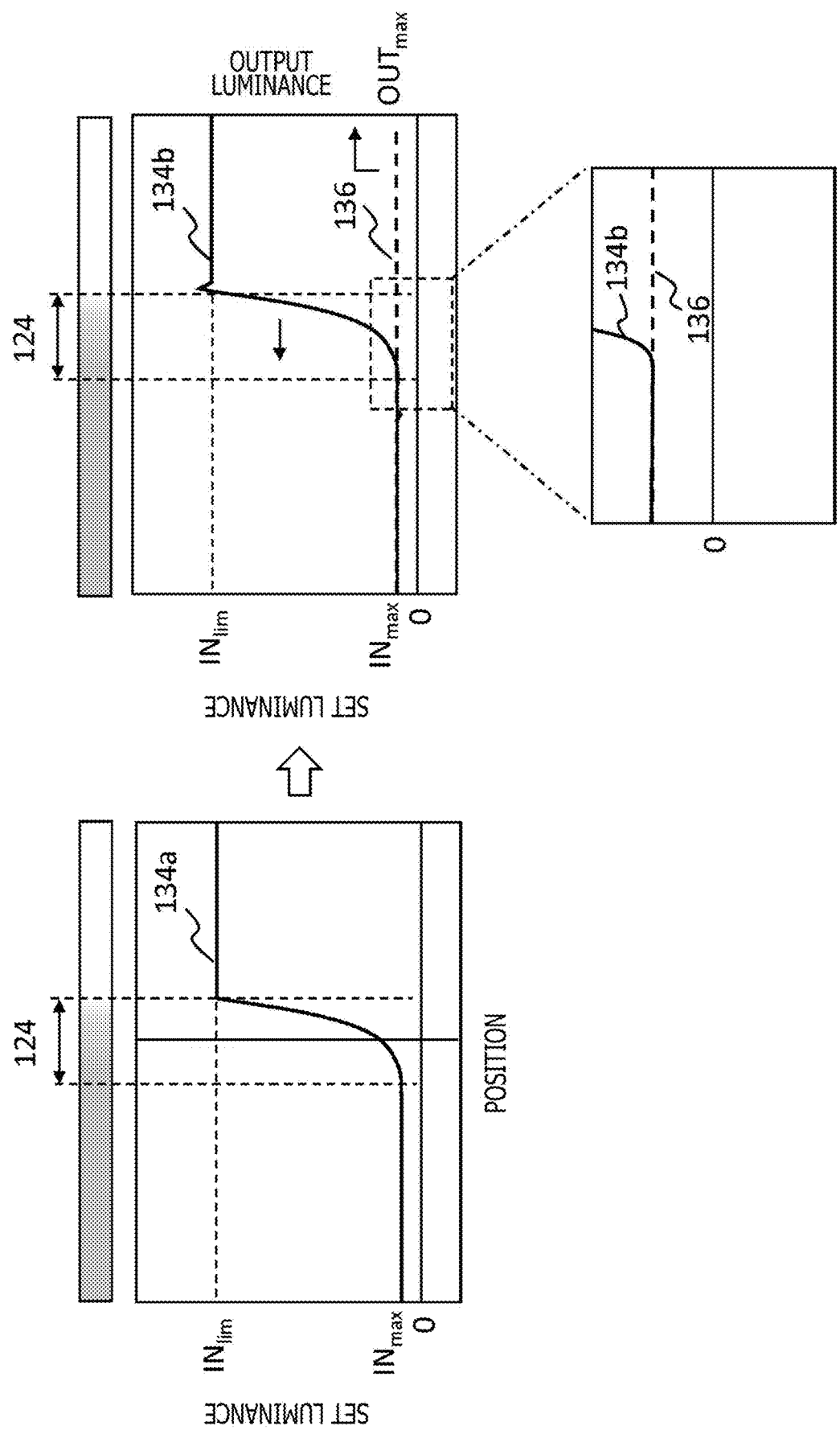

IMAGE PROCESSING APPARATUS, CALIBRATION METHOD, AND COMPUTER PROGRAM

BACKGROUND

The present disclosure relates to an image processing apparatus causing an image to be displayed on a display apparatus, a calibration method performed by the image processing apparatus, and a computer program.

Heretofore, various technologies for enhancing an image quality in video display of television broadcasting, a delivered moving image, and the like have been developed. In recent years, in addition to the technology for enhancing resolution and color gamut, a technology for processing a signal in a high dynamic range (HDR) in which a range of luminance is expanded has been popular. Since a tolerance of luminance of the HDR is approximately 100 times as large as that of a past standard dynamic range (SDR), an object, such as reflection of the sunlight, which is felt as dazzling in the real world can be more realistically expressed even on an image. Not only in the television broadcasting and the delivered moving image, but also in the world of computer graphics such as a game image, the virtual world can be made richer in you-are-there feeling by the expression in the HDR. This technology, for example, is described in Japanese Patent Laid-Open No. 2016-58848.

SUMMARY

Even when dynamic image expression is tried to be realized by utilizing a broad luminance space to the full extent, the view of the world of the original image or the intention of an image producer is difficult to faithfully reproduce in some cases due to a luminance range which the display apparatus displaying such an image can output, signal processing up to the display, and the like. For example, in a case where the luminance range which the display apparatus can handle is smaller than the luminance range which is given to the original image, generally, such transformation as to compress the gradation of the luminance in a high-luminance region is performed.

As a result, even when the object is drawn in detail in a bright place, the sky, or the like within the image, some of the information associated with the object is lost, and is not visually recognized by a user in some cases. In addition, the luminance of each of the pixels in the actually displayed image changes depending on a control system inside the display apparatus, a luminance distribution within the image, a light emission time of an element, and the like. For this reason, it is also considered that even when the image is identical in terms of data, the visibility changes in response to these factors.

The present disclosure has been made in the light of such problems, and it is therefore desirable to provide a technology which can stably present intended image expression on a display apparatus.

According to an embodiment of the present disclosure, there is provided an image processing apparatus, including a calibration section acquiring luminance characteristics of a display apparatus on a basis of a user manipulation for a calibration screen image displayed on the display apparatus, a luminance transforming section transforming a range of luminance composing a pixel value of an image into a range of luminance with which the image can be outputted as a display image on a basis of the luminance characteristics, and an output section outputting data associated with an image having the luminance after the transformation as a pixel value. The calibration section adjusts an initial state of the calibration screen image on a basis of information peculiar to the display apparatus, and then causes the calibration screen image to be displayed on the display apparatus.

According to another embodiment of the present disclosure, there is provided a calibration method executed by an image processing apparatus, including acquiring luminance characteristics of a display apparatus on a basis of a user manipulation for a calibration screen image displayed on the display apparatus, transforming a range of luminance composing a pixel value of an image into a range of luminance with which the image can be outputted as a display image on a basis of the luminance characteristics, and outputting data associated with an image having the luminance after the transformation as a pixel value. In the acquiring the luminance characteristics, an initial state of the calibration screen image is adjusted on a basis of information peculiar to the display apparatus, and then the calibration screen image is displayed on the display apparatus.

According to still another embodiment of the present disclosure, there is provided a computer program for a computer, including: by a calibration section, acquiring luminance characteristics of a display apparatus on a basis of a user manipulation for a calibration screen image displayed on the display apparatus; by a luminance transforming section, transforming a range of luminance composing a pixel value of an image into a range of luminance with which the image can be outputted as a display image on a basis of the luminance characteristics; and by an output section, outputting data associated with an image having the luminance after the transformation as a pixel value. In the acquiring the luminance characteristics, an initial state of the calibration screen image is adjusted on a basis of information peculiar to the display apparatus, and then the calibration screen image is displayed on the display apparatus.

It should be noted that an arbitrary combination of the constituent elements described above, and the matter obtained by transforming the expression of the present disclosure among a method, an apparatus, a system, a computer program, a recording medium in which the computer program is recorded, and the like are also effective as a mode of the present disclosure.

According to the embodiments of the present disclosure, an intended image expression can be stably presented on a display apparatus.

BRIEF DESCRIPTION OF THE DRAWINGS

FIG. 15 is a view for explaining an effect when a change in luminance in the luminance transition band is made non-linear in the embodiment.

DETAILED DESCRIPTION OF PREFERRED EMBODIMENT

Figure 1:
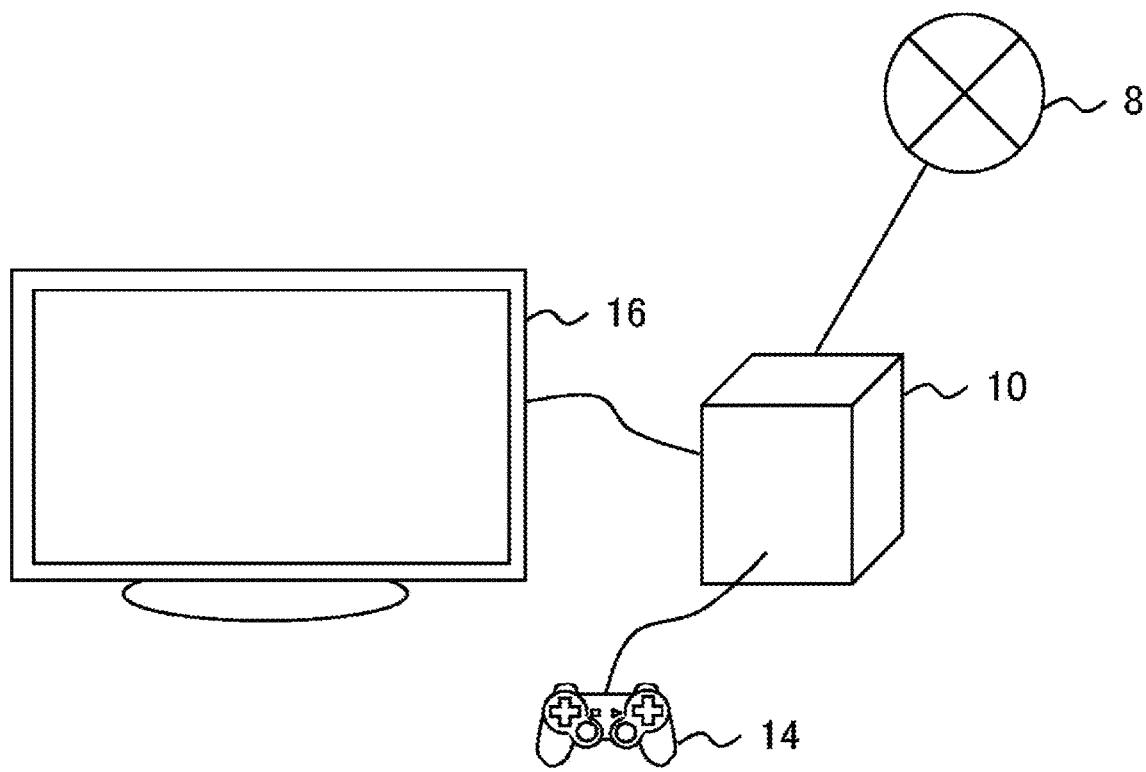
FIG. 1 is a view depicting an example of a configuration of an image processing system in an embodiment of the present disclosure.

FIG. 1 depicts an example of a configuration of an image processing system in an embodiment. The image processing system includes an image processing apparatus 10, an input apparatus 14, and a display apparatus 16. As depicted in FIG. 1, the image processing apparatus 10 may be made connectable to a server or the like which provides various kinds of content through a network 8 such as the Internet. The input apparatus 14 may be a general input apparatus which a user can manipulate such as a controller, a keyboard, a mouse, a joy stick, or a touch pad, an imaging apparatus which photographs the user or the like in the real world, a microphone which acquires a sound, a sensor which detects various kinds of physical values, or a combination of any ones among them.

The display apparatus 16 is realized by a liquid crystal display, a plasma display, an organic electroluminescence (EL) display or the like which display an image. The display apparatus 16 may further include a speaker which outputs a sound. The input apparatus 14 and the display apparatus 16 may be connected to the image processing apparatus 10 through a wired cable, or may be connected to the image processing apparatus 10 through a wireless local area network (LAN) or the like in a wireless manner. In addition, appearance forms of the input apparatus 14, the display apparatus 16, and the image processing apparatus 10 are not limited to those depicted in FIG. 1, and, for example, two or more apparatuses of these apparatuses may be formed integrally with each other.

The image processing apparatus 10 receives a signal pertaining to a user manipulation from the input apparatus 14, executes processing according to the user manipulation to generate data associated with an image to be displayed, and outputs the data to the display apparatus 16. The image processing apparatus 10 may be any one of a game machine, a personal computer, a tablet terminal, a portable terminal, a mobile phone, and the like. Depending on a form of such an image processing apparatus 10, and an application, content or the like which the user selects, content of the processing which the image processing apparatus 10 executes may be various.

For example, the image processing apparatus 10 causes an electronic game specified by the user to proceed in accordance with a user manipulation, draws data associated with a screen image of the game at a predetermined frame rate, and outputs the data. Alternatively, the image processing apparatus 10 may acquire data streams associated with a moving image from the server through the network 8, sequentially decode the data streams, and output the decoded data streams. The image processing apparatus 10 may read out data, associated with a moving image, stored in a recording medium, sequentially decode the data, and output the decoded data. Hereinafter, the drawing by the image processing apparatus 10 itself, and the decoding of image data generated elsewhere will be generally referred to as "generation" of an image by the image processing apparatus 10.

In such a configuration, the image processing apparatus 10, for example, generates an image representing the luminance of each color for each pixel by 16-bit floating point, and quantizes the resulting image to obtain an electrical signal of ten bits or the like, thereby transmitting the electrical signal to the display apparatus 16. After inverse-quantizing the electrical signal into a luminance, the display apparatus 16 transforms the luminance into a voltage and drives a display panel, thereby outputting an image. Here, since a luminance range which can be outputted is various depending on the display apparatus 16, transformation processing for the luminance for causing a wide luminance range expressed in the original image to fall within a luminance range which can be outputted, or so-called tone mapping, is performed.

Figure 2:
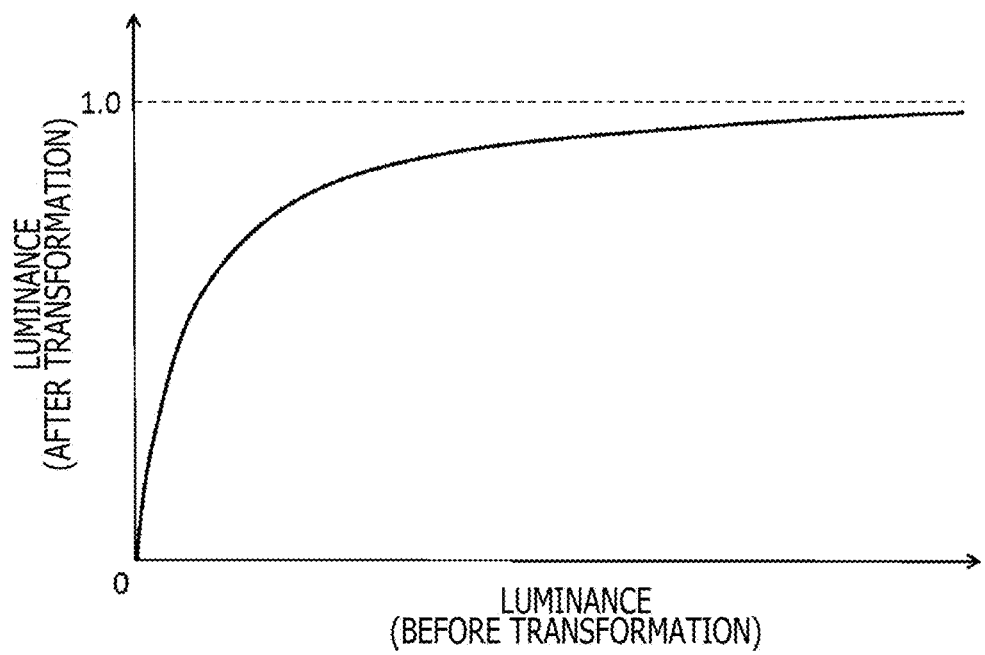
FIG. 2 is a graph exemplifying a transformation function which has been heretofore used in tone mapping.

FIG. 2 exemplifies a transformation function which has been heretofore used in the tone mapping (hereinafter, referred to as "a tone curve"). The figure indicates a Reinhard function as a typical tone curve, and such transformation as to gradually suppress the gradation from a low-luminance region toward a high-luminance region in consideration of the visual property of the human being is realized. As a result, regardless of the luminance range of the display apparatus, the influence of compression of the luminance range on the appearance can be reduced. In addition, by determining such a tone curve in consideration of the average luminance of the original image, an intermediate portion of the compressed luminance range, and thus rough distinction between the low-luminance region and the high-luminance region, can be adjusted in accordance with the brightness of the entire image.

Figure 3:
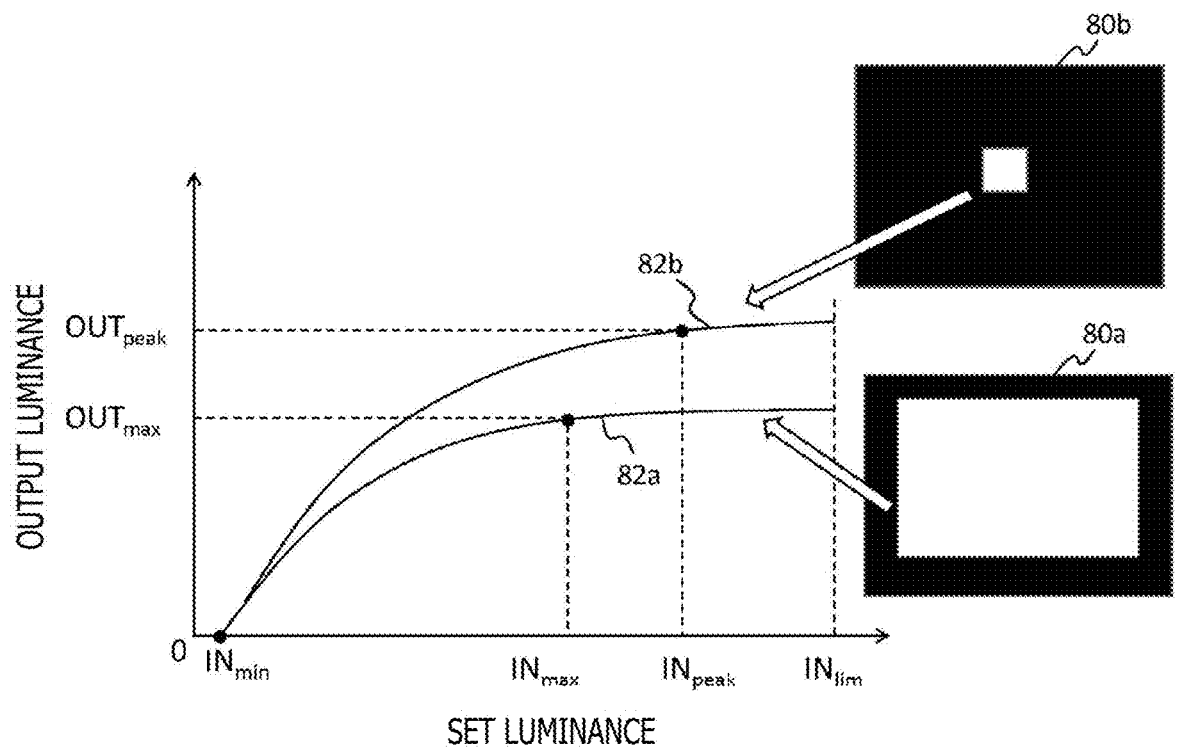
FIG. 3 is a view exemplifying luminance characteristics of a display apparatus in the embodiment.

Meanwhile, in such tone mapping, in the brighter place within the image, the easier it becomes to lose the detailed expression given in the original image due to the compression of the gradation. The loss in the level of detail due to the gradation compression in the high-luminance region can be caused also by characteristics of output luminance in the display apparatus 16. FIG. 3 exemplifies luminance characteristics of the display apparatus 16. In a graph in the figure, an axis of abscissa represents the luminance (set luminance) after the transformation by the tone mapping, and an axis of ordinate represents the output luminance when an element of the display is caused to emit light on the basis of the set luminance.

The luminance after the transformation in the tone curve depicted in FIG. 2 corresponds to the "the set luminance" of FIG. 3. Luminance $IN_{lim}$ is an upper limit value of the settable luminance in terms of numeric value in the display apparatus 16, and when the set luminance is changed from 0 to $IN_{lim}$, naturally, the output luminance also has a tendency to increase. However, similarly to the case of the tone curve, the output luminance comes to saturate in the high-luminance region. For example, in the case of a luminance characteristic 82a, when the set luminance is equal to or larger than $IN_{min}$ and equal to or smaller than $IN_{max}$, the output luminance is also largely changed from 0 to $OUT_{max}$. When the set luminance is larger than $IN_{max}$, even if the set luminance is increased, there is no large change in output luminance. That is, a substantial maximum value of the output luminance is approximately luminance $OUT_{max}$.

In addition, even when the set luminance is smaller than $IN_{min}$, the output luminance is kept approximately at 0 and is not changed. Hereinafter, the range of the set luminance in which the output luminance can be substantially changed will be referred to as "an effective luminance range." The luminance characteristics are changed also by a luminance distribution on the displayed image. That is, a general display apparatus controls the brightness on the display by the luminance distribution of the image, thereby preventing the power consumption from exceeding a specified value. For this reason, as depicted on the right side of the figure, as compared with the case of an image 80b having a small area of the high-luminance region, when an image 80a having a large area of the high-luminance region is displayed, the maximum output luminance is suppressed.

As a result, in the case where the image 80b having the small area of the high-luminance region is displayed, there is obtained a luminance characteristic 82b in which outputting is performed with higher luminance even with the same set luminance. It is considered that when the range of the luminance which can be substantially outputted is widened in such a manner, the effective luminance range is also widened. In the example depicted in the figure, as compared with the maximum value $IN_{max}$ of the effective luminance range at the time of displaying the image 80a having the large area of the high-luminance region, a maximum value $IN_{peak}$ of the effective luminance range at the time of displaying the image 80b having the small area of the high-luminance region is large. Such luminance characteristic 82b results in that the dynamic expression up to larger output luminance $OUT_{peak}$ becomes possible.

The behavior of the luminance characteristics is not limited to those depicted in the figure and is largely changed due to various factors such as a decision as to whether or not the display apparatus 16 can handle the HDR, and by what policy the output luminance is controlled. As a result, even in the case of the same object drawn by the same algorithm, the appearance of the displayed image of the object can be largely changed depending on the display apparatus, a configuration of the image, and the like. For example, in a fighting game, if an enemy object which is located at a bright place in a virtual space is easy to see or hard to see depending on the display apparatus, this becomes a problem related to the fairness in the game itself.

Accordingly, in the embodiment, predetermined parameters which regulate the luminance characteristics as depicted in the figure are acquired on the basis of the image actually displayed on the display apparatus 16, and the tone curve is generated according to the parameters, thereby suitably adjusting the range of the set luminance inputted to the display apparatus 16. For example, like the image 80a, after the image in which an area rate of the high-luminance region to the screen image is equal to or larger than a predetermined value is displayed, the minimum value $IN_{min}$ and the maximum value $IN_{max}$ of the effective luminance range are acquired.

In addition, like the image 80b, after the image in which the area rate of the high-luminance region to the screen image is smaller than the predetermined value is displayed, the maximum value $IN_{peak}$ of the effective luminance range is acquired. In the present embodiment, it is desirable that in a state in which the user actually looks at an image, the originally intended image is visually recognized in a suitable manner. Therefore, a suitable calibration screen image is presented for each parameter in such a way that the parameters as described above can be readily decided based on the subjectivity of the user.

Hereinafter, with respect to the maximum value $IN_{max}$ of the effective luminance range at the time of displaying the image in which the area rate of the high-luminance region is equal to or larger than the predetermined value, the maximum value $IN_{peak}$ of the effective luminance range at the time of displaying the image in which the area rate of the high-luminance region is smaller than the predetermined value will be simply referred to as "peak set luminance." In addition, these parameters acquired by the calibration are generally referred to as "luminance characteristics of the display apparatus" in some cases.

Figure 4:
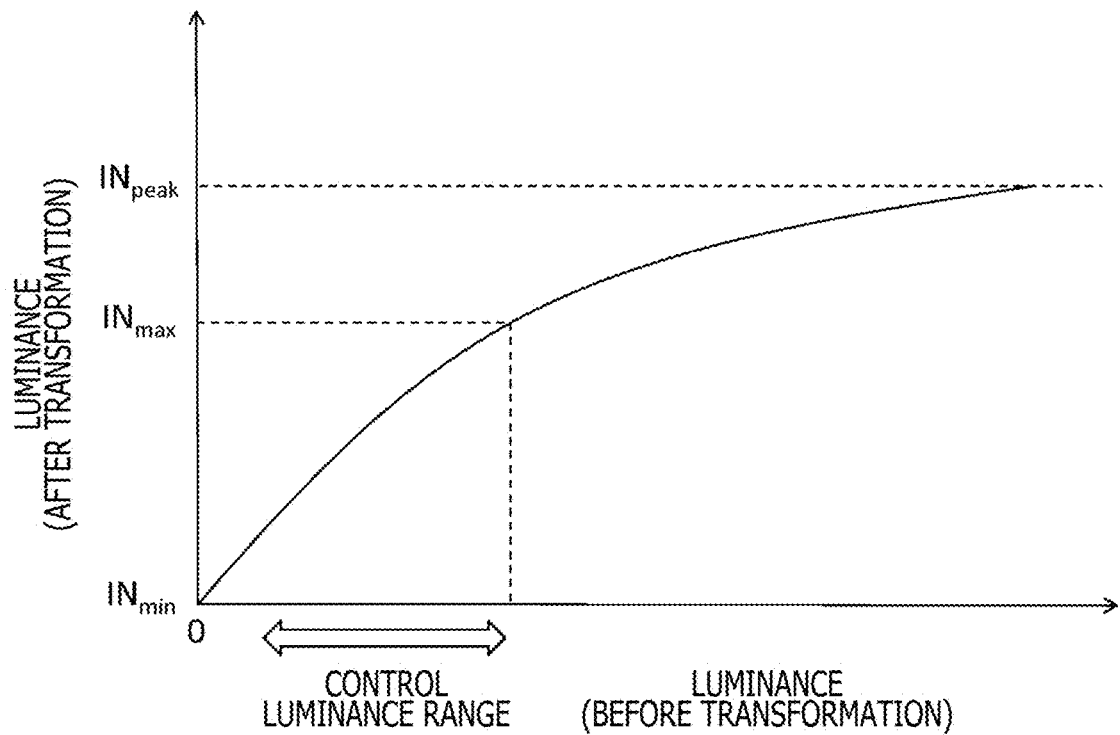
FIG. 4 is a graph exemplifying a relation among a minimum value, a maximum value, and peak set luminance of an effective luminance range, and a generated tone curve in the embodiment.

FIG. 4 exemplifies a relation among the minimum value $IN_{min}$, the maximum value $IN_{max}$, and the peak set luminance $IN_{peak}$ of the effective luminance range, and the generated tone curve. Similarly to the case of FIG. 2, an axis of abscissa represents the luminance before the transformation by the tone mapping, and an axis of ordinate represents the luminance after the transformation by the tone mapping, in a word, the set luminance inputted to the display apparatus 16. In addition, "control luminance range" indicated in the axis of abscissa by an arrow is a range of luminance, in the original data, of an object for which the presenter of the image desires to maintain the level of detail like the enemy object described above. In the tone curve depicted in the figure, first, it is set that the control luminance range becomes equal to or smaller than the maximum value $IN_{max}$ of the effective luminance range after the transformation.

In addition, it is set that a black color (luminance=0) in the original data becomes the minimum value $IN_{min}$ of the effective luminance range after the transformation. The association of these matters results in that the gradation is secured irrespective of the area of the high-luminance region in the screen image and the luminance range of the object, and the level of detail in the display is ensured. Moreover, the setting is performed in such a way that the maximum value or the upper limit of the luminance in the original data becomes the peak set luminance $IN_{peak}$ after the transformation. As a result, with respect to an object for which the luminance which the display apparatus can output is desired to be utilized to the maximum limit like a flash or a sparkle in a dark place, the dynamic expression becomes possible. As a result, the loss in expression or visibility of an important point is suppressed while the original image world is respected.

However, the parameters acquired by the calibration and the generation rules for the tone curve utilizing the parameters are not limited thereto in effect. In addition, the control luminance range may not be strict data. For example, by acquiring the luminance range for the expression of an object which is important in the entire content, and by giving the luminance range thus acquired a predetermined amount of margin, the control luminance range may be decided. Alternatively, the control luminance range may be obtained relatively in detail for each scene of the content, for each frame, or the like. In this case, the tone curve is generated in a scene unit or in a frame unit. Alternatively, the control luminance range may be fixed irrespective of the content.

In addition, for "the luminance" in the embodiment, the luminance which is given as pixel values for the colors of red, green, and blue (RGB) is mainly supposed. However, the RGB images can be replaced with the pixel values in a case where the RGB images are transformed into images having different attributes such as luminance images and color difference images, the coordinates in a color space which is represented by a combination of the luminance of RGB, or the like.

Figure 5:
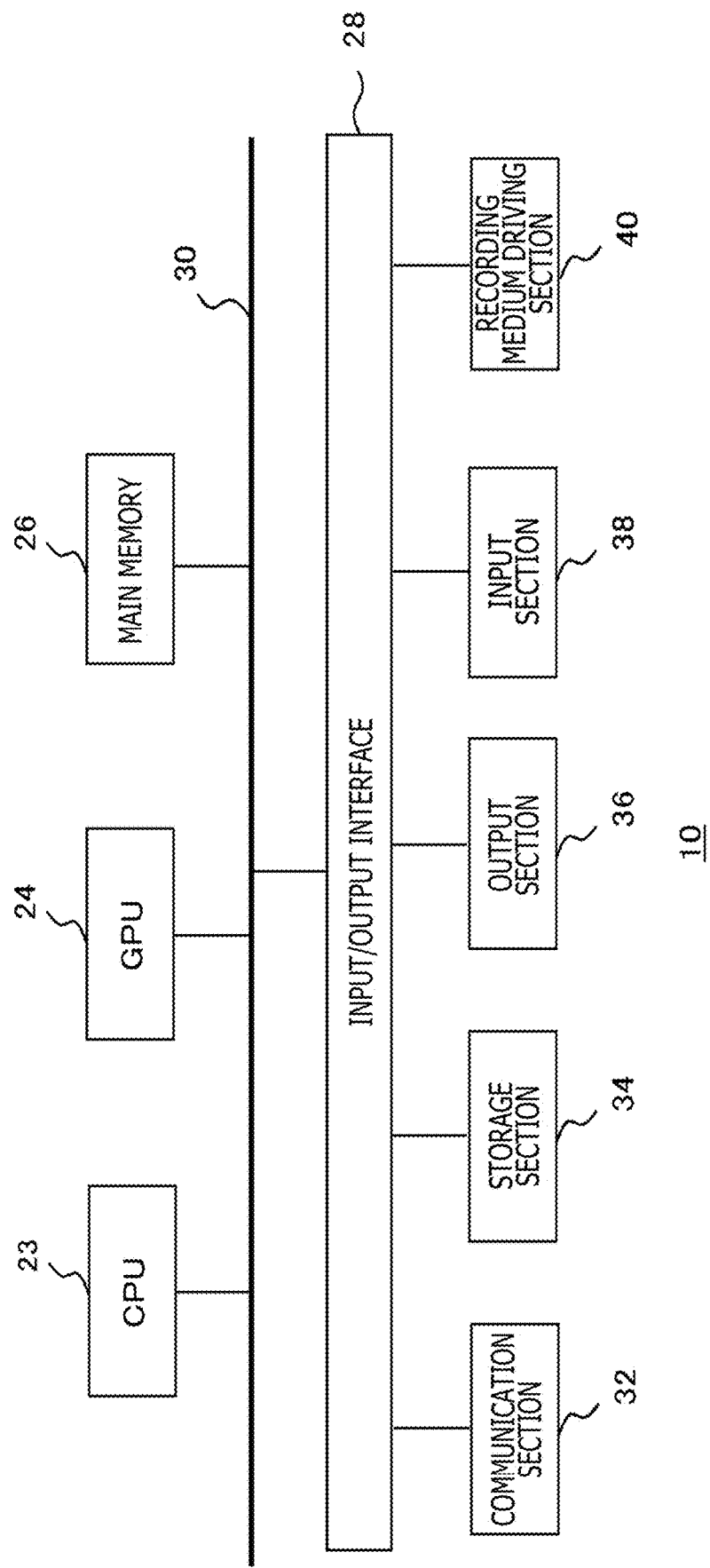
FIG. 5 is a block diagram depicting a configuration of an internal circuit of an image processing apparatus according to the embodiment of the present disclosure.

FIG. 5 depicts a configuration of an internal circuit of the image processing apparatus 10. The image processing apparatus 10 includes a central processing unit (CPU) 23, a graphics processing unit (GPU) 24, and a main memory 26. These units are connected to one another through a bus 30. An input/output interface 28 is further connected to the bus 30. A communication section 32 including a peripheral apparatus interface such as a universal serial bus (USB) or an Institute of Electrical and Electronics Engineers (IEEE) 1394 or a network interface of a wired or wireless LAN connected to the network 8 or the like, a storage section 34 such as a hard disc drive or a non-volatile memory, an output section 36 which outputs data to the display apparatus 16, an input section 38 which receives as input thereof data from the input apparatus 14 or the display apparatus 16, and a recording medium driving section 40 which drives a removable recording medium such as a magnetic disc, an optical disc or a semiconductor memory are connected to the input/output interface 28.

The CPU 23 controls the whole of the image processing apparatus 10 by executing an operating system stored in the storage section 34. The CPU 23 also executes various kinds of programs which are read out from the removable recording medium to be loaded into the main memory 26, or are downloaded through the communication section 32. In addition, the communication section 32 may establish communication with an external apparatus such as a server through the network 8, may acquire information pertaining to the display apparatus 16 or data associated with electronic content, may transmit data generated inside the image processing apparatus 10, and so forth.

The GPU 24 has a function of a geometry engine and a function of a rendering processor, and executes drawing processing in accordance with a drawing instruction issued from the CPU 23, and stores data associated with an image to be displayed in a frame buffer not depicted. Then, the GPU 24 transforms the image to be displayed stored in the frame buffer into a video signal and outputs the resulting video signal from the output section 36, thereby causing the image to be displayed on the display apparatus 16. The main memory 26 includes a random access memory (RAM), and stores therein a program or data used for the processing.

Figure 6:
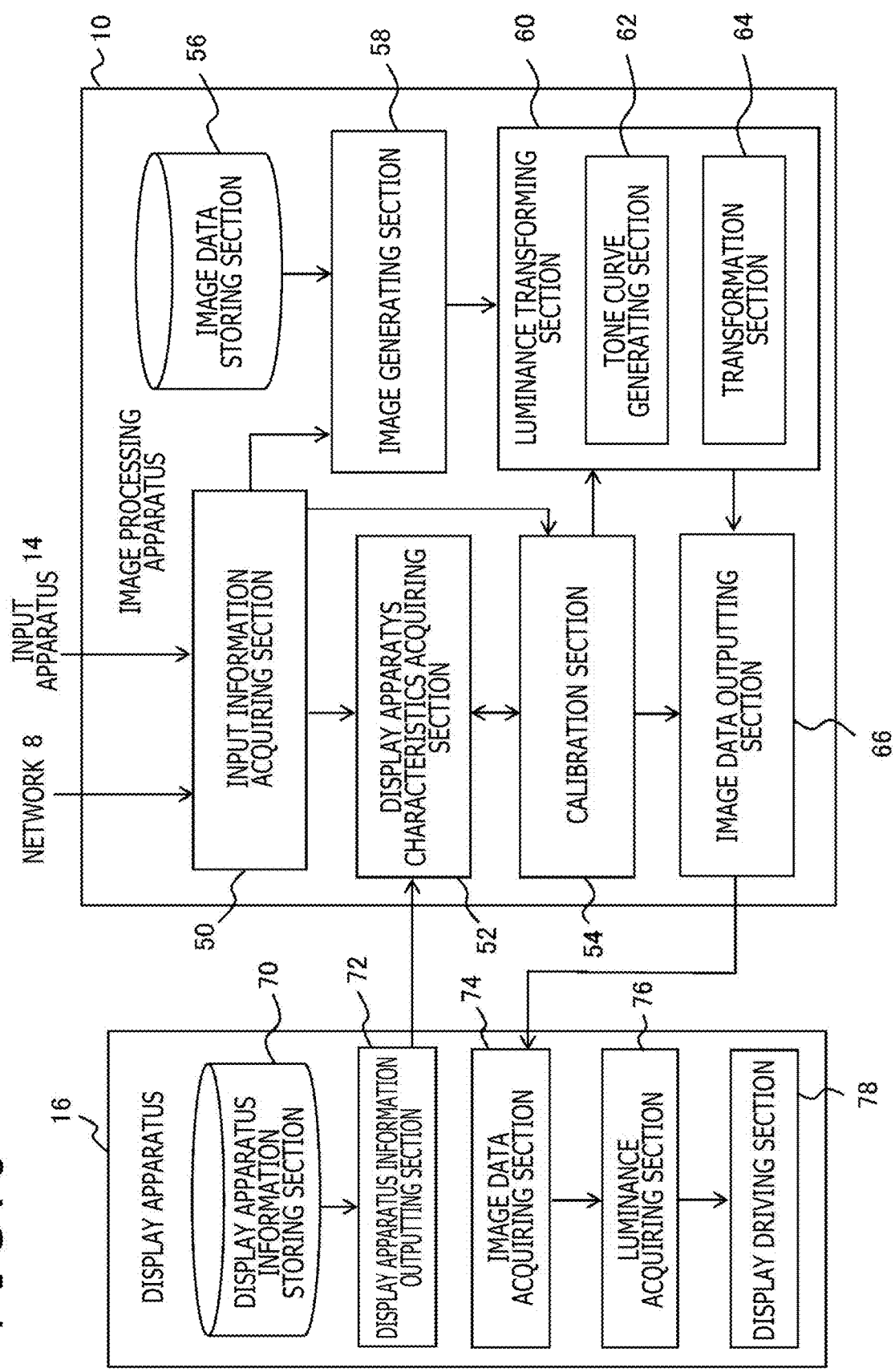
FIG. 6 is a block diagram depicting a configuration of functional blocks of the image processing apparatus and the display apparatus in the embodiment.

FIG. 6 depicts a configuration of functional blocks of the image processing apparatus 10 and the display apparatus 16. The functional blocks depicted in the figure, in terms of hardware, can be realized by the configuration of the CPU, the GPU, the various kinds of memories, the data bus and the like depicted in FIG. 5 and, in terms of software, can be realized by a program fulfilling functions such as a data inputting function, a data holding function, a calculation function, an image processing function, a communication function, and the like which is loaded from the recording medium or the like into the memory. Therefore, it is understood by a person skilled in the art that these functional blocks can be realized in various forms by only hardware, only software or a combination thereof, and are not limited to any one thereof.

The image processing apparatus 10 includes an input information acquiring section 50 which acquires data to be used from the input apparatus 14 or the network 8, a display apparatus characteristics acquiring section 52 which acquires an approximate value of the luminance characteristics of the display apparatus 16, and a calibration section 54 which performs calibration. The image processing apparatus 10 also includes an image generating section 58 which generates an image, an image data storing section 56 which stores data used in the image generation, a luminance transforming section 60 which performs tone mapping, and an image data outputting section 66 which outputs image data to the display apparatus 16.

The input information acquiring section 50 is realized by the input section 38, the CPU 23, and the like, and acquires data indicating the content of the user manipulation from the input apparatus 14. Specifically, the input information acquiring section 50 acquires the content of the user manipulation performed on a calibration screen image which the calibration section 54 causes to be displayed on the display apparatus 16. In addition, the input information acquiring section 50 suitably acquires the content of the user manipulation performed for general content processing such as selection of an application to be executed or content to be outputted, start/end of processing, and a command input to an application.

In a case where an imaging apparatus and various kinds of sensors are introduced as the input apparatus 14, the input information acquiring section 50 may acquire data such as a captured image and output values from the sensors. The input information acquiring section 50 may also acquire data associated with electronic content such as a moving image, information pertaining to the luminance characteristics of the display apparatus 16 which will be described later, or the like from the server through the network 8. The input information acquiring section 50 suitably supplies the acquired data to the display apparatus characteristics acquiring section 52, the calibration section 54, and the image generating section 58.

The display apparatus characteristics acquiring section 52 is realized by the input section 38, the CPU 23, and the like, and acquires an approximate value of a parameter which is acquired by the calibration and which represents the luminance characteristics of the display apparatus 16. For this reason, the display apparatus characteristics acquiring section 52 first acquires predetermined information of the display apparatus 16 itself from the display apparatus 16. For example, it is considered that extended display identification data (EDID) which the general display apparatus 16 holds in the inside thereof is utilized. The EDID is a standard of identification data pertaining to the display, and a product identifier (ID), year of manufacture, a maker ID, an aspect ratio, a gamma value, and the like are stored.

After acquiring at least any of these pieces of data by using a general communication method such as a high-definition multimedia interface (HDMI; registered trademark), the display apparatus characteristics acquiring section 52 acquires an approximate value of the luminance characteristics of the display apparatus 16. For this reason, a database in which information obtained from the display apparatus 16 such as a product ID, and concrete values of the luminance characteristics are associated with each other is prepared in advance inside the display apparatus characteristics acquiring section 52. For example, a change in output luminance with respect to the set luminance is measured in advance by using a real machine, thereby obtaining various kinds of luminance characteristics, and the various kinds of luminance characteristics are associated with the product ID and the like to produce the database.

Such a database may be prepared in advance in the server which is connectable through the network 8, and the display apparatus characteristics acquiring section 52 may make an inquiry on the basis of the information acquired from the display apparatus 16, thereby obtaining the luminance characteristics. However, the kind of information acquired from the display apparatus 16 by the display apparatus characteristics acquiring section 52 is not especially limited. In a case where the luminance characteristics can be directly obtained from the display apparatus 16, the luminance characteristics may be acquired in such a manner.

The calibration section 54 causes a predetermined image for calibration to be displayed on the display apparatus 16, and receives a user manipulation responding thereto, thereby optimizing the value of the luminance characteristics used in production of the tone curve. That is, it is made possible that, after confirming the actual visual performance, the user adjusts the approximate value of the luminance characteristics acquired by the display apparatus characteristics acquiring section 52. As a result, the optimal luminance transformation based on the change of the visual performance due to various factors which change is hardly obtained from bibliographic information can be performed, the factors including a secular change of the display apparatus 16, the brightness in a display environment, and the like.

As described above, the luminance characteristics are largely changed depending on whether or not the display apparatus 16 can handle the HDR, the control policy of the output luminance inside the display apparatus 16, and the like. For this reason, at the time of calibration, after the approximate value of the luminance characteristics derived from the actually connected display apparatus 16 is presented, the adjustment by the user is received, thereby enabling the calibration to be streamlined. In addition, since for the user, the level of difficulty of the calibration manipulation is reduced, the optimal state is easy to reach.

Moreover, even if an inexperienced user ends the calibration without performing the adjustment, the setting of the approximate value enables an image display far from the optimal state to be avoided. In such a manner, the calibration in the present embodiment has a shade of meaning such as the optimization of the approximate value. For this reason, in a case where a plurality of kinds of parameters are acquired as the luminance characteristics of the display apparatus 16 as described above, the display apparatus characteristics acquiring section 52 acquires approximate values with respect to the respective parameters.

Leaving room for the calibration results in that a measurable error is allowed for the approximate value of the luminance characteristics acquired by the display apparatus characteristics acquiring section 52. Therefore, the display apparatus characteristics acquiring section 52 does not strictly acquire the luminance characteristics peculiar to the display apparatus 16, but may acquire the approximate value of the luminance characteristics on the basis of the relatively large classification, of the display apparatus 16, such as a decision as to whether or not the display apparatus 16 can handle the HDR. A concrete example of procedure of the calibration performed by the calibration section 54 will be described later.

The image generating section 58 is realized by the CPU 23, the GPU 24, the main memory 26, and the like, and generates data associated with an image to be displayed in accordance with the information such as the user manipulation acquired from the input information acquiring section 50. For example, in a case where the user selects a game, the image generating section 58 draws a game image responding to the user manipulation, the output values from the sensors, and the like at a predetermined frame rate.

In this case, the image generating section 58 suitably reads out a program for proceeding with a game, data associated with an object model for drawing an image, or the like from the image data storing section 56. Alternatively, the image generating section 58 may decode and expand data associated with a moving image or a still image which is specified by the user. The data associated with the image may be data stored in advance in the image data storing section 56, or data delivered from the server through the network 8. Alternatively, the image generating section 58 may acquire data associated with an image captured by an imaging apparatus included in the input apparatus 14, and may decode and expand the image data. Moreover, the image generating section 58 also acquires information pertaining to a control luminance range corresponding to these pieces of image data.

For example, in a mode in which a game image is displayed, a target object with regard to which the level of detail is desired to be maintained is previously specified as additional information of a program or an object model of a game. Then, the image generating section 58, when drawing an image frame, acquires a range of luminance with which the target object is displayed or a maximum value thereof as information pertaining to the control luminance range. In this case, the control luminance range is temporally changed due to a movement of the target object, a change in illuminance in a vertical space, or the like.

Alternatively, even in the case of such a game image, the control luminance range can be fixed. For example, a change in luminance which is supposed in the target object is acquired in a stage of production of the game, and maximum luminance is set as the additional information of the game program or the object model. In this case, when processing of the game is started, for example, it is only necessary that the image generating section 58 reads out the additional information. Incidentally, a target becoming a cornerstone of the control luminance range may not be a specific object.

For example, the target becoming the cornerstone may be a region within an image, which is specified by some sort of rule, such as a foreground region or a region representing character information in the image. The control luminance range may be directly specified irrespective of the content of the image in some cases. Alternatively, the image generating section 58 may derive the control luminance range in accordance with a predetermined rule on the basis of a position of a light source and a position of a virtual screen in a virtual space such as a light map. In this case, there is performed a natural adjustment for the luminance range of the whole image such as avoiding a state in which the image as a whole is too bright, so that the detail is hard to see because a light source is nearby.

In addition, in a mode in which an image of separately prepared content is displayed, the information pertaining to the control luminance range is added in advance to the data of the content, and the image generating section 58 reads out the information at the time of start of the processing, or the like. In a case where the content is a moving image, a temporal change of the control luminance range may be set as the additional information, or a fluctuation of the control luminance range over the entire moving image may be acquired and the maximum luminance thereof may be set as the additional information. The image generating section 58 sequentially supplies the data associated with the generated image and the information pertaining to the control luminance range to the luminance transforming section 60.

The luminance transforming section 60 is realized by the GPU 24, the main memory 26, and the like, and includes a tone curve generating section 62 which generates the tone curve representing a transformation rule for the luminance, and a transformation section 64 which transforms the luminance of the image. The tone curve generating section 62 generates the tone curve in accordance with the predetermined rule as described in FIG. 4 on the basis of the value of the luminance characteristics of the display apparatus 16 which the calibration section 54 acquires. In a case where the control luminance range is fixed, at a time point at which the display apparatus 16 is connected, when the content is first processed, or the like, it is only necessary that the tone curve is generated once. In a case where the control luminance range is changed for each scene or is sequentially changed, the tone curve generating section 62 sequentially generates the tone curve in response to the change.

The transformation section 64 transforms, by using the tone curve thus generated, the respective pieces of luminance of the colors which the pixel values of the image generated by the image generating section 58 represent. The image data outputting section 66 is realized by the CPU 23, the GPU 24, the main memory 26, the output section 36, and the like, quantizes the luminance obtained through the transformation by the transformation section 64 by using a predetermined transfer function, and outputs electronic data associated with an image which is obtained by setting the quantized values as the pixel values to the display apparatus 16. The image data outputting section 66 further outputs electronic data associated with the image for calibration to the display apparatus 16 in accordance with a request from the calibration section 54.

Here, the calibration section 54 changes the set luminance in a predetermined region of the image for the calibration in accordance with the user manipulation performed on the input apparatus 14. That image is caused to be displayed on the display apparatus 16 through the image data outputting section 66, whereby the change of the output luminance with respect to the change of the set luminance is presented in a visible manner. Then, the user is caused to decision-input a time point at which there is obtained a predetermined state such as a case where even when the set luminance is changed, a change in luminance for the display is invisible, thereby acquiring the set luminance at that time as a final value of the luminance characteristics. Since the data associated with the image for the calibration is defined with the set luminance which the user can directly adjust, it is unnecessary to perform the luminance transformation by the luminance transforming section 60.

The display apparatus 16 includes a display apparatus information storing section 70 which stores the information associated with the display apparatus 16 itself, a display apparatus information outputting section 72 which outputs the information to the image processing apparatus 10, and an image data acquiring section 74 which acquires image data of content from the image processing apparatus 10. The display apparatus 16 also includes a luminance acquiring section 76 which transforms information associated with an electrical signal of the image data into a value of luminance, and a display driving section 78 which drives a display with luminance after the transformation.

The display apparatus information storing section 70 stores the information associated with the display apparatus 16 itself like the EDID described above. The display apparatus information outputting section 72 reads out information from the display apparatus information storing section 70 in response to an inquiry or the like from the image processing apparatus 10, and outputs the information thus read out to the image processing apparatus 10. The image data acquiring section 74 acquires data associated with an image frame from the image processing apparatus 10. The data, as described above, is the electronic data which is obtained by quantizing the luminance after the tone mapping. The image data acquiring section 74 also acquires the data associated with the calibration screen image from the image processing apparatus 10.

The luminance acquiring section 76 inverse-quantizes the data associated with the image frame, thereby acquiring the set luminance of each of the pixels. The display driving section 78 drives the display with a voltage based on the luminance after the transformation, thereby displaying the image. Although a relation between the set luminance and the output luminance at this time is as exemplified in FIG. 3, the luminance transformation fitted to the display apparatus 16 has been performed for the data transmitted from the image processing apparatus 10, so that the image is expressed with the optimal gradation allocation irrespective of the display apparatus 16.

Figure 7:
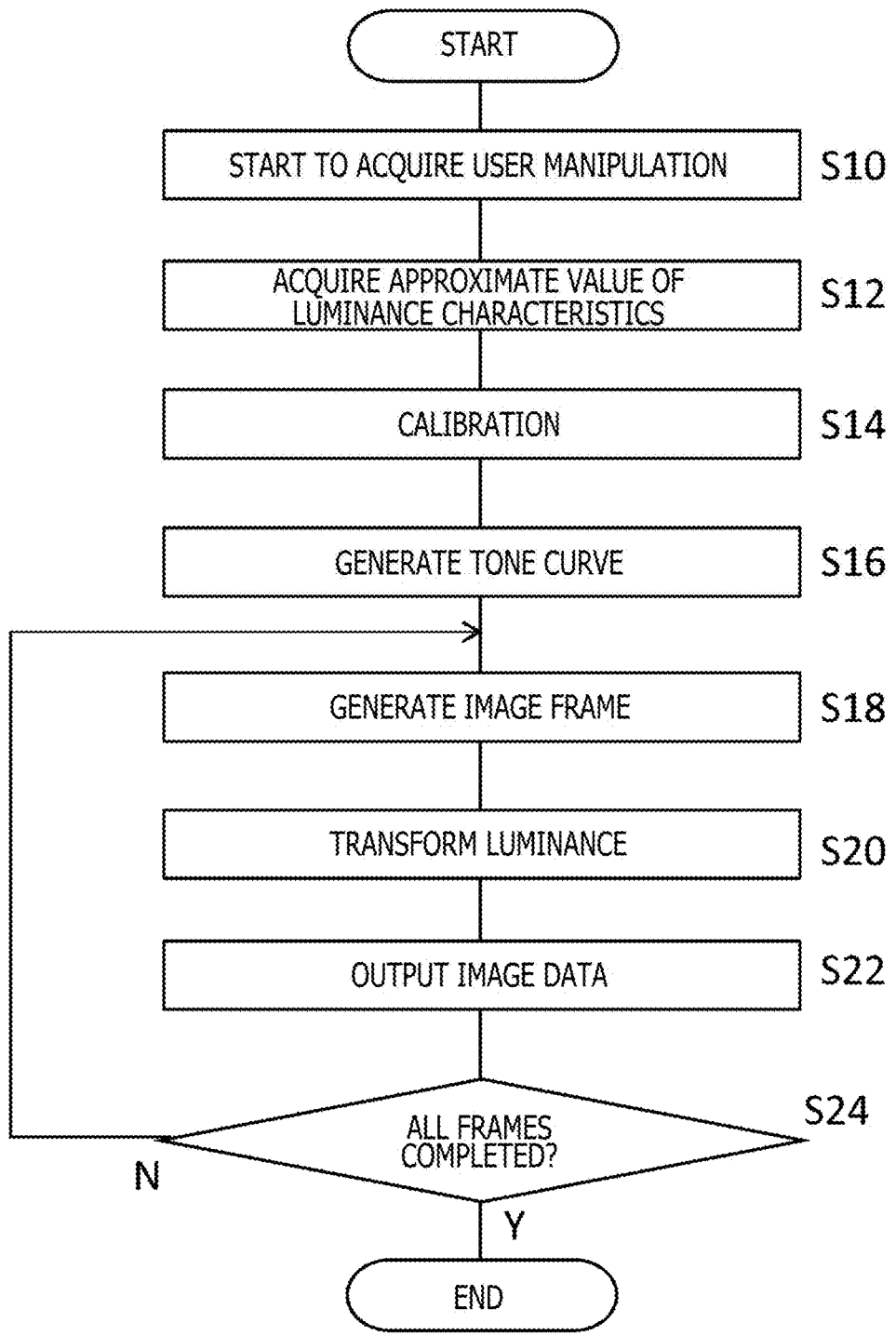
FIG. 7 is a flow chart depicting a processing procedure in which the image processing apparatus in the embodiment generates image data and outputs the resulting image data to the display apparatus.

Next, a description will be given with respect to an operation of the image processing apparatus 10 realized by the configuration described so far. FIG. 7 is a flow chart depicting a processing procedure in which the image processing apparatus 10 in the present embodiment generates image data and outputs the image data to the display apparatus. This flow chart is started when the image processing apparatus 10 and the display apparatus 16 establish communication between them. In this state, the input information acquiring section 50 starts to acquire the content of the user manipulation through the input apparatus 14 (S10). In and after the subsequent processing, a manipulation by the user shall be received at any time.

After acquiring the information pertaining to the display apparatus 16 from the connected display apparatus 16 in response to a request or the like to start the processing by the user, the display apparatus characteristics acquiring section 52 acquires an approximate value of the necessary luminance characteristics on the basis of the information pertaining to the display apparatus 16 (S12). That is, the database stored inside the image processing apparatus 10 or in the server or the like connected through the network is searched on the basis of a product ID or the like of the image processing apparatus 10, thereby acquiring the value of the associated luminance characteristics.

Next, the calibration section 54 causes the image for the calibration to be displayed on the display apparatus 16 to urge the user to perform the calibration while watching the image for the calibration (S14). Specifically, the calibration section 54 provides a user interface for changing the set luminance together with the image for the calibration. Then, a decision input is performed with the set luminance at the time when a predetermined criterion is reached such as a case where even when the set luminance is changed, there is no change recognized in appearance. A starting point of the set luminance at the time is set as the approximate value acquired in S12. In a case where a plurality of kinds of luminance characteristics to be acquired are set, the calibration is performed for each kind.

Next, the tone curve generating section 62 of the luminance transforming section 60 generates the tone curve as exemplified in FIG. 4 by using the luminance characteristics of the display apparatus 16 acquired by the calibration section 54 (S16). In this case, the image generating section 58 may suitably process the content specified by the user to acquire the control luminance range, and the control luminance range may be used in generation of the tone curve. In addition, the image generating section 58 generates the image frame of the content by performing the drawing or the decoding (S18).

The transformation section 64 of the luminance transforming section 60 transforms the luminance of the image generated in S18 by using the tone curve generated in S16 (S20). Subsequently, the image data outputting section 66 quantizes the luminance after the transformation by using a predetermined transfer function, and outputs the resulting data as an electrical signal for each pixel and for each color to the display apparatus 16 (S22). If the output of all the frames is not completed (N: in S24), then, with respect to the next image frame, the pieces of processing from S18 to S22 are repeated. In the display apparatus 16, the luminance is acquired and outputted for each pixel by executing general processing, thereby displaying an image with suitable luminance for each frame.

When the output of all the frames to be displayed is completed, the processing is ended (Y in S24). It should be noted that although the depicted processing procedure is effective in a case where the display apparatus 16 is connected to the image processing apparatus 10 and the content is processed for the first time, and so forth, the depicted processing procedure can be suitably omitted in and after the subsequent content processing. For example, it is only necessary that the acquisition of the luminance characteristics in S12 and S14 is performed only once as long as there is no change in the display apparatus 16 connected to the image processing apparatus 10, and it is only necessary that the resulting luminance characteristics are stored inside the tone curve generating section 62.

In a case where the control luminance range is not changed for each content, it is only necessary that the tone curve generating processing in S16 is also executed only once and the generated tone curve is stored inside the transformation section 64. In this case, the subsequent content processing has to be executed only in the pieces of processing in S18 to S24. On the other hand, in a case where the luminance transformation responding to the change of the control luminance range is realized for each content, for each frame of the content, for each scene, or the like, the tone curve generating processing in S16 is suitably executed in these units.

Figure 8:
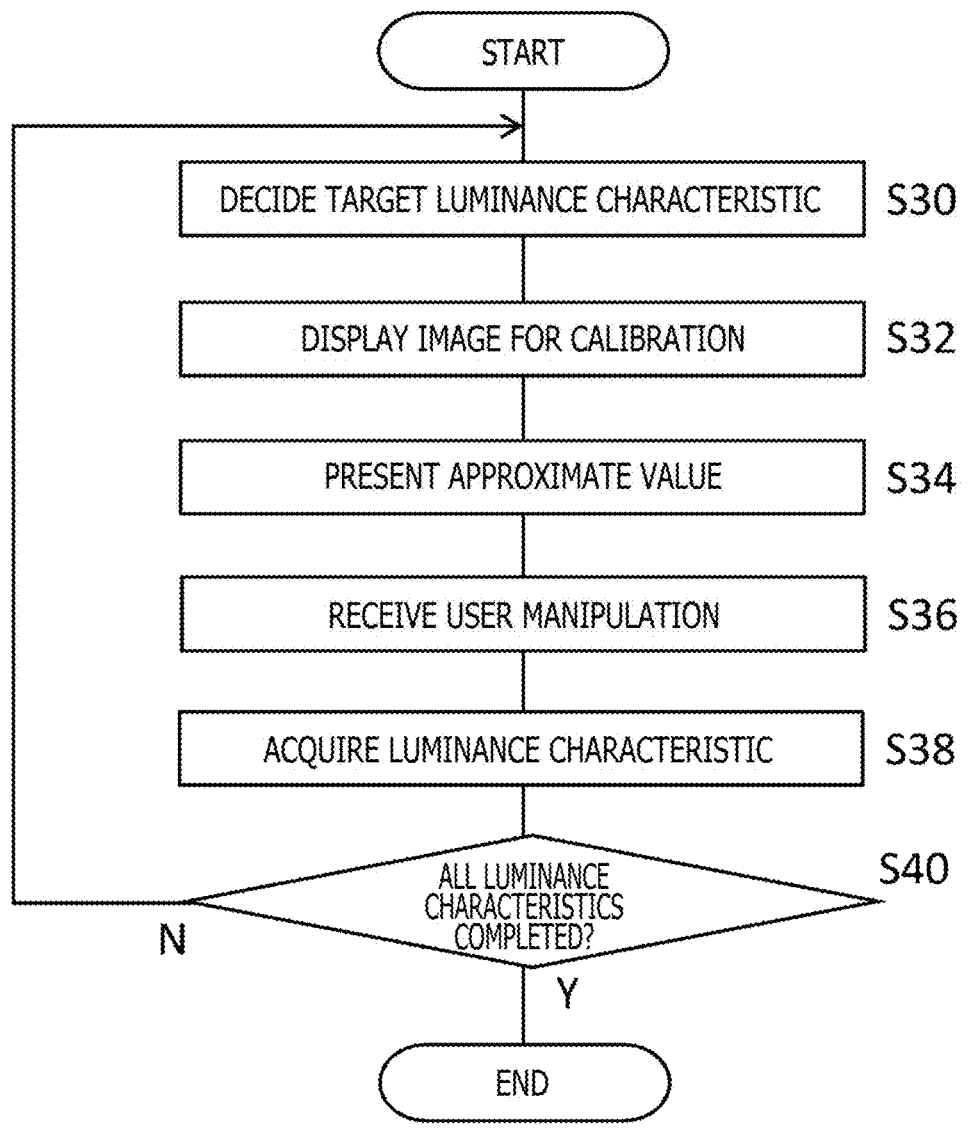
FIG. 8 is a flow chart depicting a processing procedure in which a calibration section implements calibration in S14 of FIG. 7.

FIG. 8 is a flow chart depicting a processing procedure in which in S14 of FIG. 7, the calibration section 54 performs the calibration. First, the calibration section 54 decides one luminance characteristic as a target of the calibration from among the luminance characteristics to be acquired (S30). Then, an approximate value of the luminance characteristic acquired by the display apparatus characteristics acquiring section 52 is displayed together with the image for the calibration generated in order to obtain the luminance characteristic on the calibration screen image (S32 and S34).

The approximate value is not only displayed as a numeric value but may also be presented as an initial state when the user adjusts the set luminance of the image for the calibration. The user adjusts the set luminance of at least a partial region of the image for the calibration with the approximate value as a hint, and decides the set luminance when a predetermined criterion is reached in appearance. The calibration section 54 receives these series of manipulations (S36), and acquires the set luminance at a time point at which the decision input is performed as the luminance characteristic (S38). The pieces of processing from S30 to S38 are repetitively executed until all the luminance characteristics to be acquired are acquired (N in S40). When all the luminance characteristics can be acquired, the processing is ended (Y in S40).

The image for the calibration which is displayed in S32, and the approximate value which is presented in S34 are prepared for each luminance characteristic to be acquired, whereby the level of difficulty of the calibration is reduced and the work can be streamlined. In addition, even when in S36, the user performs the decision input without adjusting the set luminance, the approximate value is acquired as the luminance characteristic, thereby ensuring certain level or more of visibility.

Figure 9:
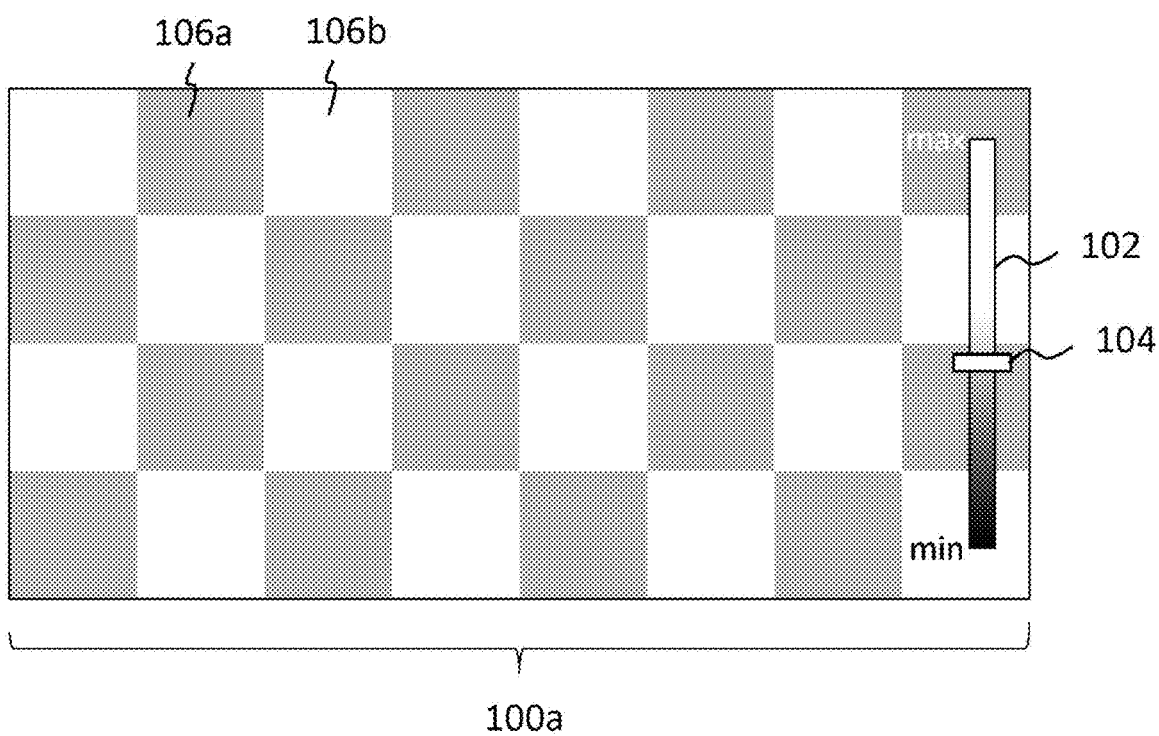
FIG. 9 is a view exemplifying a calibration screen image which the calibration section causes to be displayed on the display apparatus in the embodiment.

FIG. 9 exemplifies a calibration screen image which the calibration section 54 causes to be displayed on the display apparatus 16 in S32 and S34 of FIG. 8. The calibration screen image of this example includes an image 100a for the calibration in which two kinds of squares different in luminance from each other are alternately arranged in a transverse direction and in a longitudinal direction, and a set luminance adjusting bar 102 as a graphical user interface (GUI) for changing the set luminance of one of the two kinds of squares. As long as the image 100a for the calibration includes two kinds of regions: a region in which the set luminance can be adjusted by the GUI; and a region in which the set luminance is fixed as a reference, a pattern of the image 100a is not especially limited.

For example, the pattern may be an arrangement of circles or polygons, or may include a background, some sort of mark, and the like. In addition, although the set luminance adjusting bar 102 adopts a configuration such that as a handle 104 is moved upward, the set luminance is increased, a shape and a display position of the set luminance adjusting bar 102 are not especially limited. The figure supposes a case where a maximum value of the effective luminance range is acquired as the luminance characteristics. In this case, the image 100a for the calibration is caused to be displayed in a wide range as much as possible. In the depicted example, the image 100a for the calibration is displayed on the full screen image.

In addition, the set luminance of one of the kinds of squares (a square 106b, for example) is fixed at a settable upper limit to be set as a white reference, and the other of the kinds of squares (a square 106a, for example) is set as an adjustment target. Moreover, an initial position of the handle 104 is decided at an approximate value which the display apparatus characteristics acquiring section 52 acquires for the maximum value of the effective luminance range, or a value smaller than the approximate value by a predetermined amount. As a result, the set luminance of the initial position of the handle 104 is reflected on a color of the square 106a as the adjustment target. In the figure, for understandability, a relatively deep gray is adopted as the color of the square 106a as the adjustment target.

The maximum value of the effective luminance range, as described above, is the maximum value of the set luminance which can give a change to the output luminance when the image in which the high-luminance regions are distributed in a wide range is displayed. In other words, the maximum value of the effective luminance range is a boundary value at which even when the set luminance is further increased in an image of a gray scale, in terms of vision, the color does not change from a white color. Therefore, the user moves upward the handle 104 of the set luminance adjusting bar 102 in such a way that the color of the square 106a as the adjustment target comes close to a white color.

Then, the user stops the handle 104 at a boundary at which the square 106a as the adjustment target gets indistinguishable from the square 106b as the reference, that is, at a time point at which the whole of the image 100a for the calibration looks white, and the user performs the decision input by using a decision section not depicted of the input apparatus 14. The calibration section 54 acquires the set luminance at the time of the decision input as the maximum value of the effective luminance range. It should be noted that character information for teaching such a manipulation to be performed by the user may be further displayed on the calibration screen image. This also applies to a calibration screen image which will be hereinafter stated.

Figure 10:
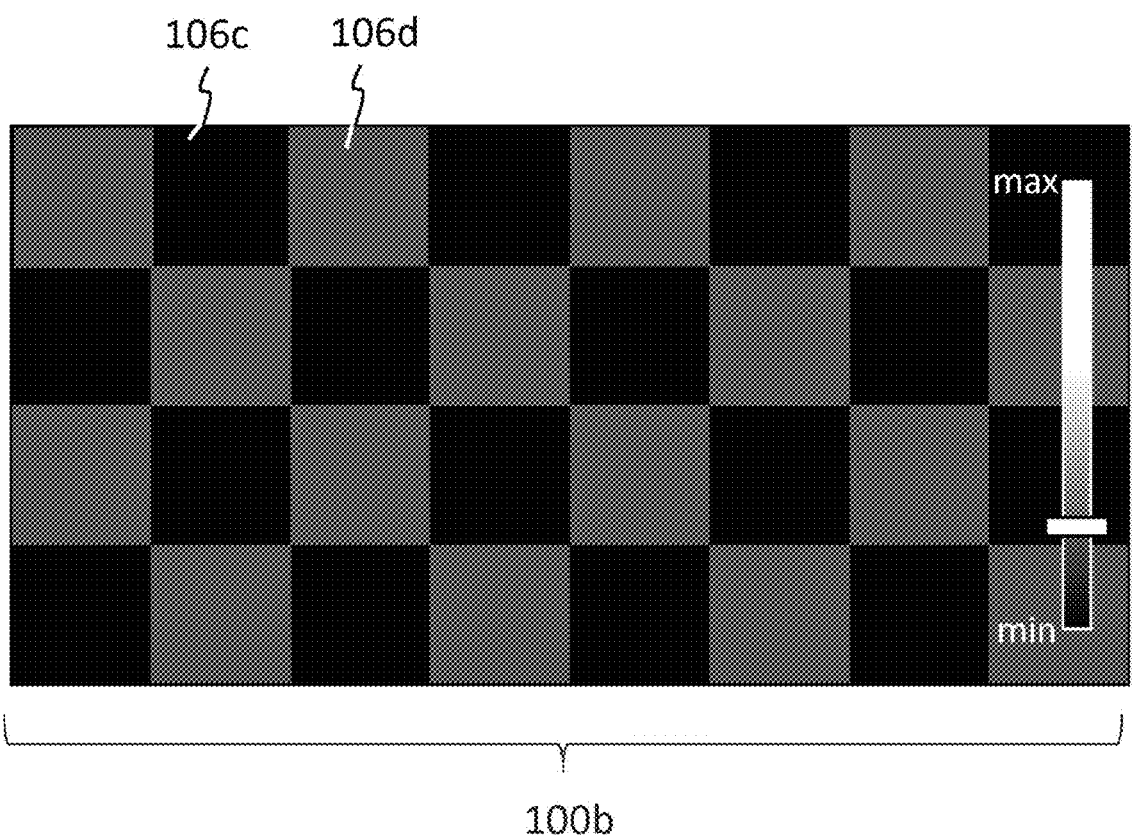
FIG. 10 is a view depicting another example of the calibration screen image which the calibration section causes to be displayed on the display apparatus in the embodiment.

FIG. 10 depicts another example of the calibration screen image which the calibration section 54 causes to be displayed on the display apparatus 16. In this example, it is supposed that a minimum value of the effective luminance range is acquired as the luminance characteristics. This parameter, as described above, is a minimum value of the set luminance which can give a change to the output luminance. In other words, the minimum value of the effective luminance range is a boundary value at which in an image of the gray scale, even when the set luminance is further reduced, in terms of vision, the color does not change from a black color. Although a display area of the image for the calibration in this screen image is not especially limited, FIG. 10 adopts the same configuration as that of FIG. 9.

Then, the set luminance of one of the kinds of squares (a square 106c, for example) is fixed to 0 or the like to be made a reference of a block color, and the other of the kinds of squares (a square 106d, for example) is set as an adjustment target. In addition, an initial position of the handle 104 is decided at an approximate value which the display apparatus characteristics acquiring section 52 acquires for the minimum value of the effective luminance range, or at a value which is larger than the approximate value by a predetermined amount. As a result, the set luminance of the initial position of the handle 104 is reflected on a color of the square 106d as the adjustment target.

The user moves downward the handle 104 of the set luminance adjusting bar 102 in such a way that the color of the square 106d as the adjustment target comes close to the black color. Then, the user stops the handle 104 at a boundary at which the square 106d as the adjustment target gets indistinguishable from the square 106c as the reference, that is, at a time point at which the whole of the image 100a for the calibration looks black, and performs the decision input by using the input apparatus 14. The calibration section 54 acquires the set luminance at the time of the decision input as the minimum value of the effective luminance range.

Figure 11:
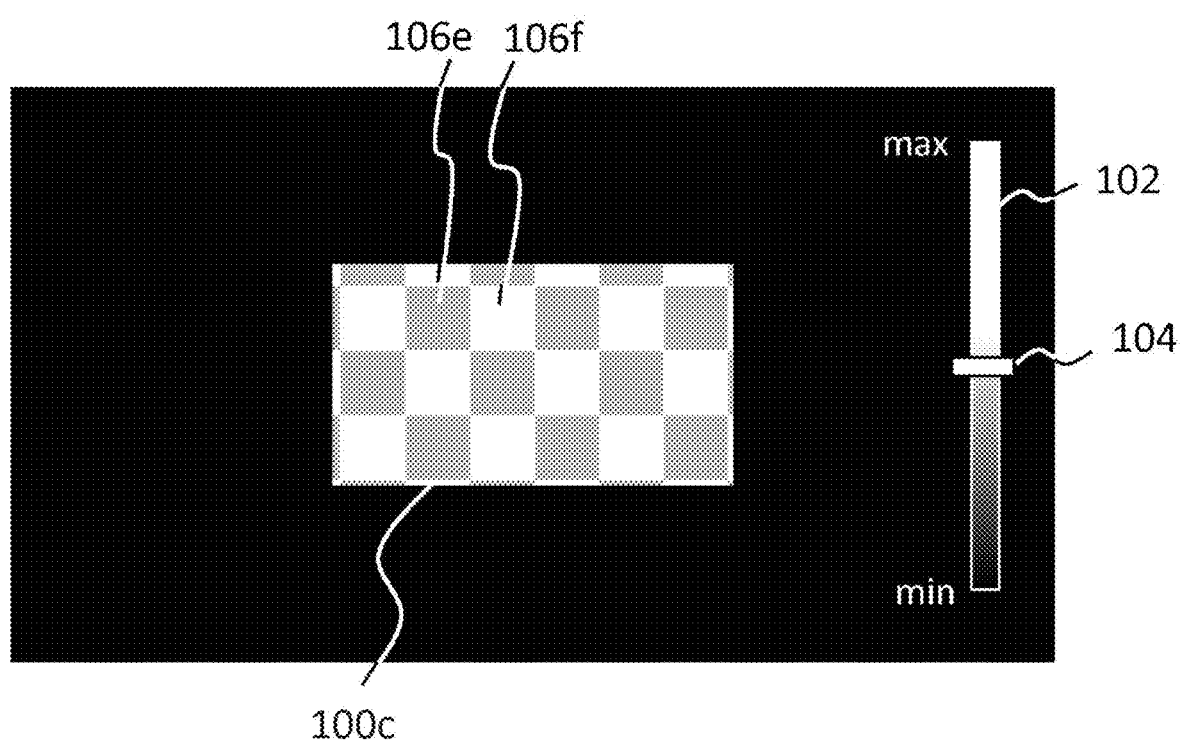
FIG. 11 is a view depicting still another example of the calibration screen image which the calibration section causes to be displayed on the display apparatus in the embodiment.

FIG. 11 depicts still another example of the calibration screen image which the calibration section 54 causes to be displayed on the display apparatus 16. In this example, it is supposed that peak set luminance is acquired as the luminance characteristics. The peak set luminance, as described above, is a maximum value of the set luminance which can give a change to the output luminance in a state in which the maximum output luminance of the display apparatus 16, or the luminance close to the maximum output luminance can be obtained. When the area of the high-luminance region is small, the maximum output luminance is obtained as the characteristics of the display apparatus 16. Therefore, in the depicted calibration screen image, an image 100c for calibration is displayed in a smaller area than the image 100a for the calibration depicted in FIG. 9, and a color of a remaining region is set as a black color.

An area rate of the high-luminance region when the maximum output luminance is obtained is various depending on the performance of the display apparatus 16 or the policy of the luminance control. Therefore, the display apparatus characteristics acquiring section 52 may acquire the area rate of the high-luminance region when the maximum output luminance is obtained in the connected display apparatus 16 by a procedure similar to the case of the approximate values of other luminance characteristics. Then, the calibration section 54 decides the display area of the image 100c for the calibration on the basis of the data in the above case, whereby the image expression in which the range of the luminance which the display apparatus 16 can actually display is sufficiently utilized is performed. However, the rate of the display area of the image 100c for the calibration may be fixed without depending on the display apparatus 16, or may be determined by rough classification to which the display apparatus 16 belongs.

Besides the case in which the area of the image 100c for the calibration is made small in such a manner, the peak set luminance can be acquired by a procedure similar to the case of the calibration for the maximum value of the effective luminance range depicted in FIG. 9. That is, the set luminance of one of the kinds of squares (a square 106f, for example) is fixed at a settable upper limit or the like to be set as a white reference, and the other of the kinds of squares (a square 106e, for example) is set as an adjustment target. Moreover, an initial position of the handle 104 is decided at an approximate value which the display apparatus characteristics acquiring section 52 acquires for the peak set luminance, or at a value which is smaller than the approximate value by a predetermined amount.

The user moves upward the handle 104 of the set luminance adjusting bar 102 in such a way that the color of the square 106e as the adjustment target comes close to the white color. Then, the user stops the handle 104 at a boundary at which the square 106e as the adjustment target gets indistinguishable from the square 106f as the reference, and performs the decision input by using the input apparatus 14. Because the display area of the image 100c for the calibration is small, the white color of the square 106f as the reference is higher in luminance than the white color of the square 106b as the reference in the image 100a for the calibration depicted in FIG. 9. Therefore, an arrival point of the set luminance in the calibration screen image of FIG. 11 is higher than that in the case of FIG. 9. The calibration section 54 acquires the set luminance at the time of the decision input as the peak set luminance.

As described above, the approximate values of the luminance characteristics, and the area rate of the high-luminance region when the maximum output luminance is obtained are specified in advance as a value peculiar to the display apparatus 16 or peculiar to the group to which the display apparatus 16 belongs, resulting in that the calibration is performed with high accuracy and with high efficiency. On this purpose, the parameters acquired by the display apparatus characteristics acquiring section 52, and the constituent elements within the calibration screen image which the calibration section 54 changes on the basis of the parameters are not limited. For example, not only the initial position of the handle 104 may be differentiated on the basis of the approximate value of the luminance characteristics, but also the various range of the set luminance indicated by the set luminance adjusting bar 102 may be differentiated. As a result, the set luminance can be prevented from being moved to an obviously erroneous range.

Figure 12:
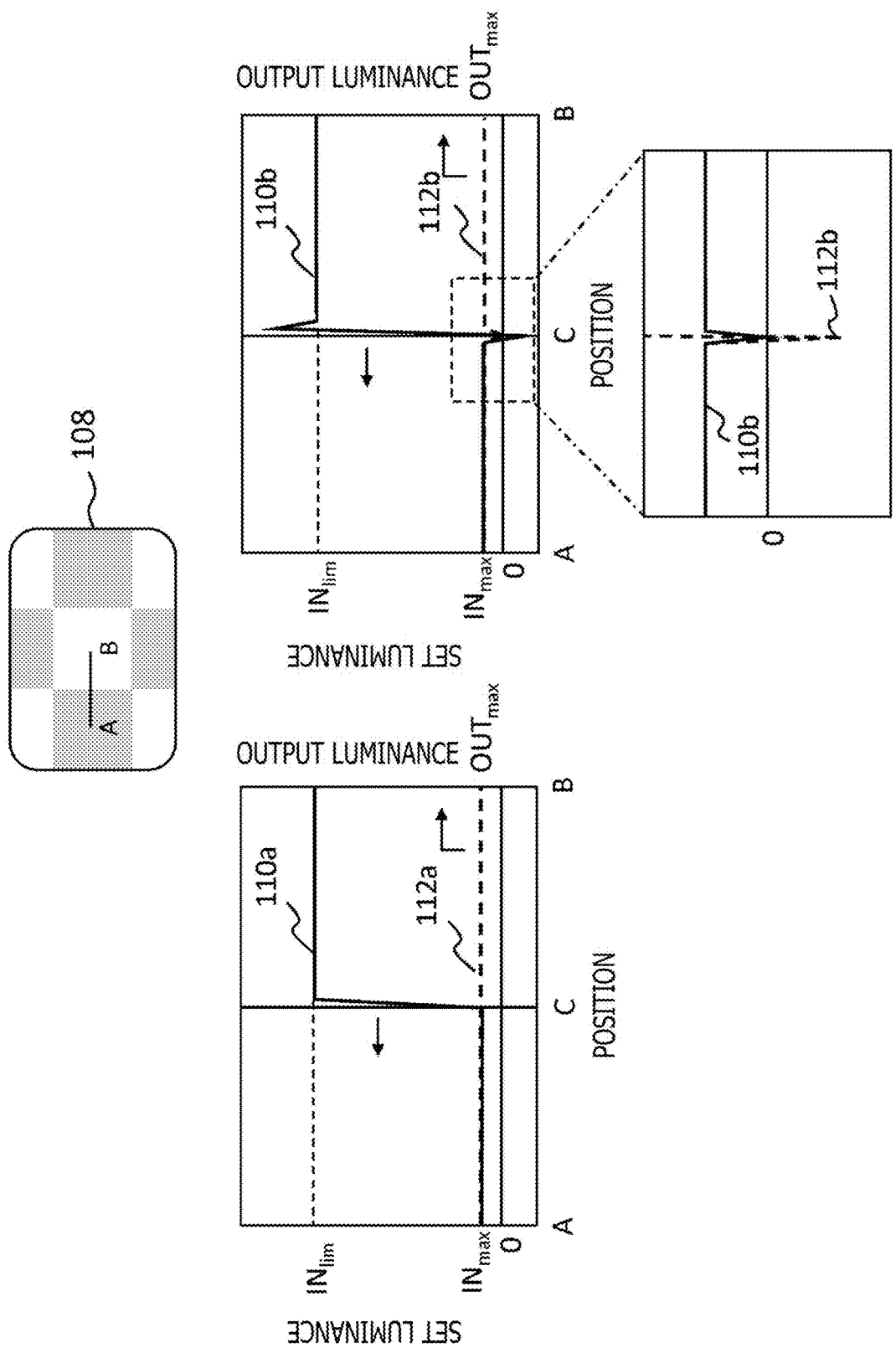
FIG. 12 is a view for explaining an influence of an edge emphasizing function of the display apparatus on the calibration.

On the calibration screen image described so far, basically, the set luminance of the square of the adjustment target is changed until the square as the adjustment target gets indistinguishable to the user from an adjacent square as the reference. However, it is possible that a bad influence is exerted on the accuracy of the calibration by an edge emphasizing function for displayed images which the display apparatus 16 generally has. FIG. 12 is a view for explaining the influence of the edge emphasizing function of the display apparatus 16 on the calibration. An upper portion of the figure depicts a partial region 108 of an image for calibration. A lower portion of the figure depicts changes of the set luminance and the output luminance on a line segment AB in the partial region 108. A position C is a boundary between the squares.

As indicated as set luminance 110*a* on the left side of the lower portion of the figure, the set luminance given to the square as the reference including a position B is the settable upper limit value $IN_{lim}$ and, for example, is 10000 nit or the like. Even with such set luminance, as indicated as output luminance 112*a*, the luminance actually outputted in the region is the substantial maximum value $OUT_{max}$ of the output luminance of the display apparatus 16 and, for example, 1000 nit or the like. According to the calibration described above, the set luminance of the square including the position A is increased from a small value to reach the maximum value $IN_{max}$ of the effective luminance range.

The set luminance 110*a* represents an ideal state at that time. In this case, since as indicated as the output luminance 112*a*, the substantial maximum value $OUT_{max}$ of the output luminance is offered at all the positions, the boundary between the squares is not visually recognized, and the maximum value $IN_{max}$ of the effective luminance range is properly acquired by the decision manipulation made by the user. However, if the display apparatus 16 has the edge emphasizing function, that is, such a function as to emphasize the contour in such a way that an image of an object is clearly shown, the boundary between the squares is emphasized also in the calibration.

That is, as indicated as set luminance 110*b* on the right side, processing is executed such that an overshoot and an undershoot occur in the set luminance in the vicinity of the boundary. In a case where the set luminance exceeds the upper limit value $IN_{lim}$ of the luminance settable in the display apparatus, the luminance is set at the upper limit value, and thus the influence of the overshoot can be ignored. On the other hand, as to the undershoot, as depicted on the lower side in an enlarged manner, the luminance becomes output luminance 112*b* on which the influence of the undershoot is reflected in the vicinity of the boundary between the squares with luminance 0 as a lower limit. In this case, even if the set luminance is adjusted up to $IN_{max}$ in the calibration, a dark linear image is left in the vicinity of the boundary, so that the squares are viewed so as to be distinguished from each other.

Then, the user shall further increase the set luminance until the squares get indistinguishable from each other, and thus the proper luminance characteristics are not obtained. This also applies to the case where the peak set luminance or the minimum value of the effective luminance range is to be acquired. Then, it is considered that the image for the calibration is devised, thereby avoiding the influence of the edge emphasizing function.

Figure 13:
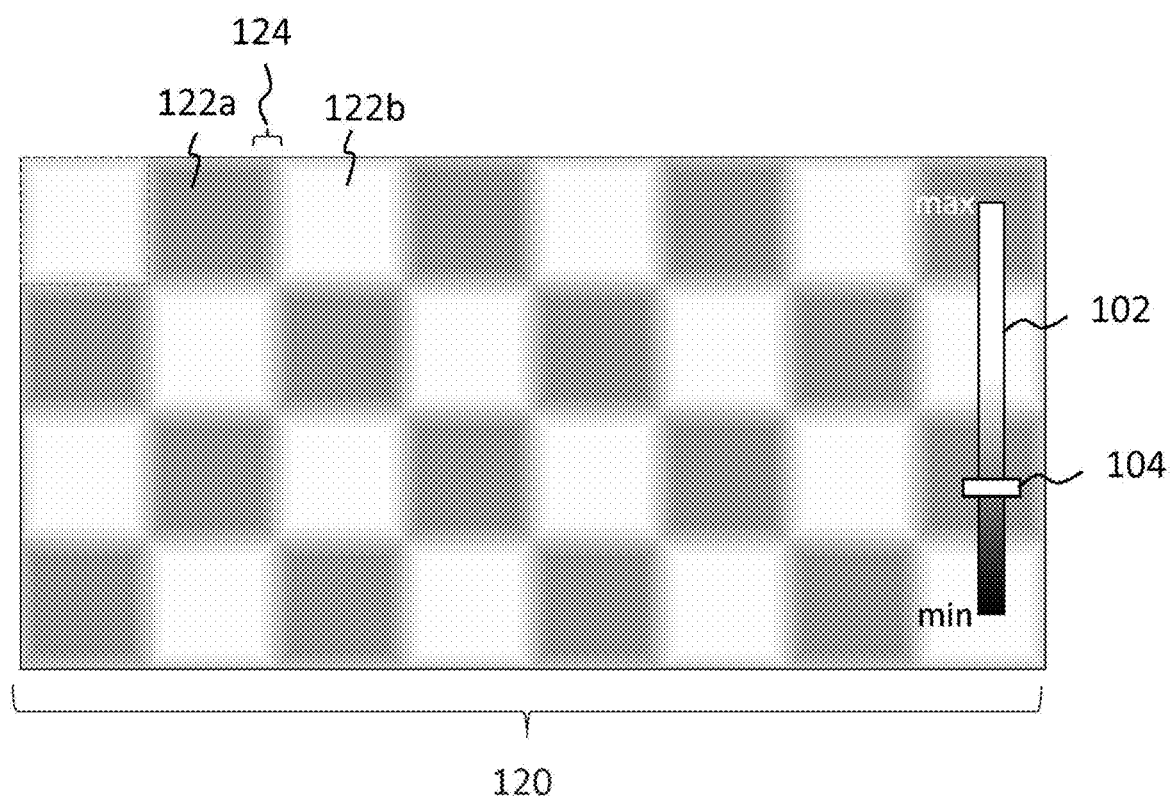
FIG. 13 is a view exemplifying a calibration screen image including an image for calibration for which the edge emphasizing function by the display apparatus is taken into consideration in the embodiment.

FIG. 13 exemplifies a calibration screen image including an image for calibration in which the edge emphasizing function by the display apparatus 16 is taken into consideration. In this example, similarly to the case of FIG. 9, there is supposed the case where the maximum value of the effective luminance range is acquired as the luminance characteristics. An image 120 for calibration is set in such a way that the luminance is spatially and smoothly changed in the vicinity of the boundary between the squares. That is, a luminance transition band (a luminance transition band 124, for example) in which the luminance gradually changes with respect to the position is provided at the boundary between a square as the reference (a square 122*b*, for example) and a square as the adjustment target (a square 122*a*, for example).

By adopting such a luminance distribution, in the image 120 for the calibration, the contour of each of the squares becomes a blurred state. Similarly to the case of FIG. 9, the user moves the handle 104 of the set luminance adjusting bar 102 to change the set luminance, and stops the handle 104 at a time point at which the squares get indistinguishable from each other, that is, the user feels that the whole of the image 120 for the calibration becomes a white color.

Figure 14:
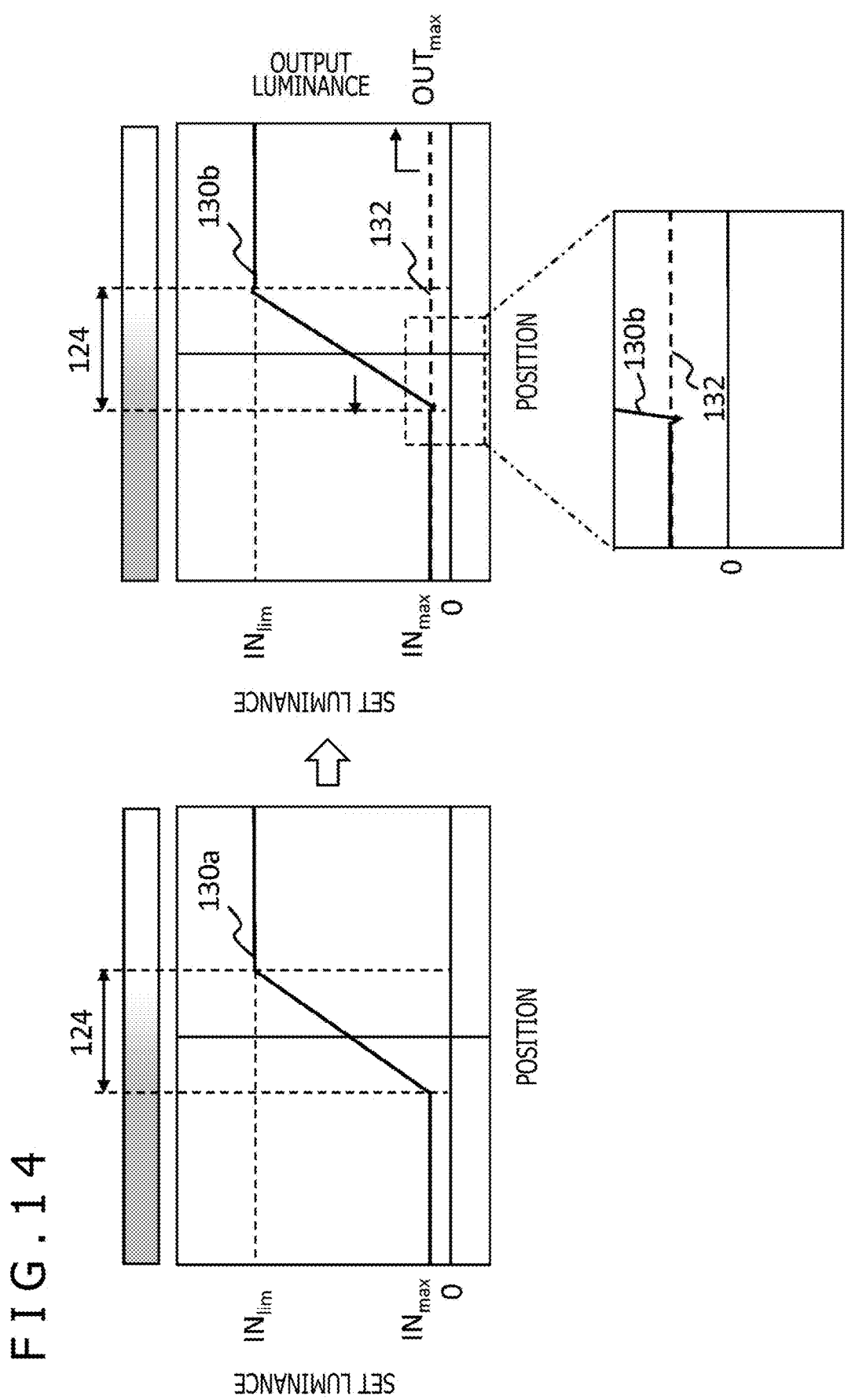
FIG. 14 is a view exemplifying changes in set luminance and output luminance in a case where a luminance transition band is provided between regions of a reference and an adjustment target in the embodiment.

FIG. 14 exemplifies changes of the set luminance and the output luminance in the case where the luminance transition band is provided between the region of the reference and the region of the adjustment target. The way of expression in the figure is similar to the case of FIG. 12 and, as a part of the image 120 for the calibration is depicted in an uppermost portion of the figure, the changes of the set luminance and the output luminance with respect to the position are depicted with the boundary between the squares as the center. The edge emphasizing function detects an edge, that is, a position at which an inclination of the luminance is large, and further emphasizes the inclination.

As indicated as set luminance 130*a* on the left side of the figure, the luminance transition band 124 is provided at the boundary between the squares, whereby the calibration section 54 causes the inclination of the luminance to usually become equal to or smaller than a predetermined value. Actually, the set luminance of the square as the adjustment target is changed until the depicted state is obtained. However, the calibration section 54 decides the set luminance in the luminance transition band 124 so as to be usually linearly connected to the set luminance $IN_{lim}$ of the square as the reference.

As a result, as indicated as set luminance 130*b* on the right side of the figure, the undershoot and the overshoot are suppressed even through the edge emphasizing processing. As a result, substantially uniform output luminance 132 is obtained in the vicinity of the boundary between the squares, and the user can decides the set luminance at a suitable timing at which the squares get indistinguishable from each other. As the width of the luminance transition band 124 is larger, the influence of the edge emphasis can be suppressed. However, if the width of the luminance transition band 124 is too large, it is difficult for the user to compare in luminance the square as the adjustment target and the square as the reference with each other, and thus it is hard to perform the calibration manipulation. For this reason, an optimal value is set in advance by performing an experiment or the like taking the balance between them into consideration.

Although in FIG. 14, the change of the luminance in the luminance transition band 124 is set as linear, the change of the luminance with respect to the position is not limited thereto. FIG. 15 is a view for explaining an effect when the change of the luminance in the luminance transition band 124 is set as non-linear. The way of expression in the figure is similar to the case of FIG. 14. In this example, as indicated as set luminance 134a on the left side of the figure, the change of the luminance in the luminance transition band 124 is set as an exponential curve. As a result, an inclination of luminance at a rising point from the luminance of the square as the adjustment target, that is, the smaller luminance side, is set smaller than a predetermined value. Incidentally, similarly to the case of FIG. 14, although the set luminance of the square as the adjustment target is actually changed until the depicted state is obtained, the calibration section 54 decides the set luminance in the luminance transition band 124 so as to be usually connected to the set luminance $IN_{lim}$ of the square as the reference in a similar shape.

As a result, as indicated as set luminance 134b on the right side of the figure, the undershoot having an influence on the output luminance can be especially suppressed. As a result, more uniform output luminance 136 is obtained in the vicinity of the boundary between the squares than in the case of the linear change depicted in FIG. 14. In the luminance transition band 124, the luminance on the side of the square as the reference has larger overshoot because of larger inclination. As described above, however, even if the settable luminance upper limit value $IN_{lim}$ is exceeded, no substantial influence is generated.

If the undershoot is suppressed by utilizing such characteristics while the appearance of the overshoot is allowed, then, the width of the luminance transition band 124 can be reduced. As a result, the luminance of the square as the adjustment target and the luminance of the square as the reference can be readily compared with each other in a near distance, and the maximum value $IN_{max}$ of the effective luminance range can be decided at an optimal timing at which the squares get indistinguishable from each other. Incidentally, as long as there is obtained a luminance change in the luminance transition band 124 such that the inclination on the side of the square as the adjustment target is reduced and the inclination on the side of the square as the reference is increased, the change of the set luminance is not limited to the exponential curve, and another curve may be adopted, or straight lines having different inclinations may be connected with each other.

In addition, also in the calibration screen images depicted in FIG. 10 and FIG. 11, a similar luminance transition band may be provided at the boundary between the squares, thereby obtaining a similar effect in the acquisition of the various kinds of luminance characteristics. Moreover, as described above, the region as the adjustment target and the region as the reference are not limited in shape to squares. Therefore, the shape of the luminance transition band is also not especially limited.

According to the embodiment described above, the image for the calibration is caused to be displayed on the display apparatus, and the predetermined luminance characteristics representing the characteristics of the change of the output luminance with respect to the set luminance are acquired through the user manipulation. Then, the set luminance representing the pixel value of the content image is decided by using the tone curve generated on the basis of the luminance characteristics, thereby enabling the similar visibility to be given to the target displayed as the image irrespective of the individual situations such as the display apparatus and the display environment.

Here, after the calibration screen image is optimized on the basis of the information obtained from the display apparatus which is actually connected, the resulting calibration screen image is presented. For example, the approximate value of the luminance characteristics to be acquired is acquired in advance, and at the time of the calibration, the adjustment is enabled to be performed with the approximate value as the criterion. In addition thereto, the display area of the image for the calibration in the calibration screen image, and the variable range of the set luminance are optimized in accordance with the display apparatus.

Even if, for example, the digit of the numeric value to be adjusted largely differs due to the performance of the display apparatus, such as whether or not the display apparatus can handle the HDR, performing the optimization described above enables an accurate value to be readily reached. In addition, even if the user or the like ends the calibration without performing the adjusting manipulation, since the approximate value can be utilized, a certain level or more of visibility is ensured. As a result, the content can be enjoyed in a stable display environment without regard to the skill of the user or the performance of the display apparatus. In addition, even if in the future, the display apparatus evolves in any ways, the existing content can be readily caused to respond to such evolution.

In addition, in the case where the set luminance of an adjacent region is changed in such a way that the region and another region having the luminance as the reference are indistinguishable from each other in the calibration manipulation, the luminance transition band in which the luminance is gradually changed with respect to the position is provided at the boundary between the two regions in the image for the calibration. In the luminance transition band, the inclination of the luminance from the region in which the set luminance is caused to be changed is made at least smaller than the predetermined value. As a result, even in the case of the display apparatus provided with the edge emphasizing function, the boundary between the regions is prevented from being recognized as the edge. As a result, the user can perform the accurate calibration while watching the image on which the adjustment of the set luminance is directly reflected.

Hereinabove, the present disclosure has been described on the basis of the embodiment. The embodiment described above is an exemplification, and thus it is understood by a person skilled in the art that various modified changes can be made in combinations of the constituent elements or the processing processes, and such modified changes are also within the scope of the present disclosure.

For example, since a display apparatus, such as a liquid crystal display apparatus, provided with a backlight has the characteristics in which the luminance is increased along with the rise in temperature of the backlight, the characteristics of the output luminance fluctuate also depending on the time elapsed from the light emission. The display position of the image for the calibration may be temporally changed in the calibration screen image in consideration of this situation. That is, in the case where the maximum value or the peak set luminance of the effective luminance range is obtained, it is considered that if the luminance of the square as the reference is reduced with a lapse of time, then the luminance characteristics shall be fitted to the output luminance in the dark state, and thus it is difficult to obtain an accurate value.

Therefore, a timer provided inside the calibration section 54 measures the display time of the image for the calibration, and at a time point at which the predetermined threshold value is exceeded, the calibration screen image is refreshed in such a way that at least the region as the reference is displayed in another region on the screen image. As a result, the inconvenience that the result differs depending on the time taken to perform the calibration can be avoided, and the proper luminance characteristics can be usually obtained under the same condition.

The present disclosure contains subject matter related to that disclosed in Japanese Priority Patent Application JP 2018-150668 filed in the Japan Patent Office on Aug. 9, 2018, the entire content of which is hereby incorporated by reference.

What is claimed is:

1. An image processing apparatus, comprising:
    a calibration section acquiring luminance characteristics of a display apparatus on a basis of a user manipulation for a calibration screen image displayed on the display apparatus;
    a luminance transforming section transforming a range of luminance composing a pixel value of an image into a range of luminance with which the image can be outputted as a display image on a basis of the luminance characteristics; and
    an output section outputting data associated with an image having the luminance after the transformation as a pixel value,
    wherein the calibration section adjusts an initial state of the calibration screen image on a basis of information peculiar to the display apparatus, and then causes the calibration screen image to be displayed on the display apparatus.

2. The image processing apparatus according to claim 1, wherein the calibration section causes an image for calibration having a region, for which a user can adjust set luminance, to be displayed as the calibration screen image, and causes the user to decide that the image for calibration reaches a predetermined criterion as a result of the adjustment of the set luminance, thereby acquiring the set luminance at that time point as the luminance characteristics.

3. The image processing apparatus according to claim 2, wherein the calibration section causes a graphical user interface for adjusting the set luminance to be displayed in the calibration screen image, and adjusts an initial value of the set luminance on the basis of the information peculiar to the display apparatus.

4. The image processing apparatus according to claim 2, wherein the calibration section causes a graphical user interface for adjusting the set luminance to be displayed in the calibration screen image, and adjusts a variable range of the set luminance on the basis of the information peculiar to the display apparatus.

5. The image processing apparatus according to claim 2, wherein the calibration section adjusts a rate of a display area of the image for the calibration to the screen image on the basis of the information peculiar to the display apparatus.

6. The image processing apparatus according to claim 2, wherein
    the calibration section presents a region for which the user can adjust the set luminance and a region as a reference for which the set luminance is fixed side by side in the image for the calibration, thereby making it the predetermined criterion for decision that the regions get indistinguishable from each other, and
    a luminance transition band in which an inclination of a change in luminance is adjusted is provided between the region for which the set luminance is adjustable and the region as the reference.

7. The image processing apparatus according to claim 6, wherein the calibration section makes a change in the luminance transition band such that an inclination of a change in luminance is smaller than a predetermined value at least at a rising point of the set luminance on a side of the adjustable region which is lower in luminance than the region as the reference.

8. The image processing apparatus according to claim 6, wherein the calibration section causes the set luminance to be changed non-linearly in the luminance transition band.

9. The image processing apparatus according to claim 1, wherein the calibration section acquires a plurality of kinds of the luminance characteristics on the basis of a user manipulation for the calibration screen image.

10. The image processing apparatus according to claim 9, further comprising:
    a display apparatus characteristics acquiring section specifying an approximate value of the luminance characteristics for each kind of the luminance characteristics on a basis of information acquired from the display apparatus,
    wherein the calibration section switches the initial state of the calibration screen image on a basis of the approximate value for each kind of the luminance characteristics.

11. The image processing apparatus according to claim 10, wherein the display apparatus characteristics acquiring section searches a database in which information that can be acquired from the display apparatus and approximate values of the luminance characteristics are stored in an associated manner, thereby acquiring an approximate value of the luminance characteristics of the display apparatus.

12. The image processing apparatus according to claim 11, wherein the display apparatus characteristics acquiring section searches the database presented through a network, thereby acquiring an approximate value of the luminance characteristics of the display apparatus.

13. The image processing apparatus according to claim 1, wherein
    the calibration section causes the user to decide a range of the set luminance within which a change in luminance on the display can be visually recognized, thereby acquiring a maximum value in the range as the luminance characteristics, and
    the luminance transforming section determines a transformation rule of a luminance range in such a way that the luminance range as a control target set for the image is equal to or smaller than the maximum value.

14. A calibration method executed by an image processing apparatus, comprising:
    acquiring luminance characteristics of a display apparatus on a basis of a user manipulation for a calibration screen image displayed on the display apparatus;
    transforming a range of luminance composing a pixel value of an image into a range of luminance with which the image can be outputted as a display image on a basis of the luminance characteristics; and
    outputting data associated with an image having the luminance after the transformation as a pixel value,
    wherein in the acquiring the luminance characteristics, an initial state of the calibration screen image is adjusted on a basis of information peculiar to the display apparatus, and then the calibration screen image is displayed on the display apparatus.

15. A non-transient, computer-readable storage medium containing a computer program, which when executed by a computer, causes the computer to carry out actions, comprising:

acquiring luminance characteristics of a display apparatus on a basis of a user manipulation for a calibration screen image displayed on the display apparatus;

transforming a range of luminance composing a pixel value of an image into a range of luminance with which the image can be outputted as a display image on a basis of the luminance characteristics; and outputting data associated with an image having the luminance after the transformation as a pixel value, wherein in the acquiring the luminance characteristics, an initial state of the calibration screen image is adjusted on a basis of information peculiar to the display apparatus, and then the calibration screen image is displayed on the display apparatus.

* * * * *